US010409253B2

(12) United States Patent
Naidoo et al.

(10) Patent No.: US 10,409,253 B2
(45) Date of Patent: Sep. 10, 2019

(54) SYSTEMS AND METHODS FOR MERGING MODULAR CONTROL SYSTEMS INTO A PROCESS PLANT

(71) Applicant: FISHER-ROSEMOUNT SYSTEMS, INC., Round Rock, TX (US)

(72) Inventors: Julian K. Naidoo, Cedar Park, TX (US); Michael G. Ott, Round Rock, TX (US); Aaron C. Jones, Round Rock, TX (US); Deborah R. Colclazier, Round Rock, TX (US); Karen Johnson, Round Rock, TX (US); Robert G. Halgren, III, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/791,123

(22) Filed: Oct. 23, 2017

(65) Prior Publication Data
US 2018/0113430 A1    Apr. 26, 2018

Related U.S. Application Data

(60) Provisional application No. 62/412,108, filed on Oct. 24, 2016.

(51) Int. Cl.
*G05B 19/05* (2006.01)
*G05B 19/418* (2006.01)

(52) U.S. Cl.
CPC .......... *G05B 19/05* (2013.01); *G05B 19/052* (2013.01); *G05B 19/41815* (2013.01);
(Continued)

(58) Field of Classification Search
CPC .......... G05B 19/05; G05B 19/052; G05B 2219/1204; G05B 2219/23258; G05B 2219/25067; Y10S 715/965
See application file for complete search history.

(56) References Cited

U.S. PATENT DOCUMENTS

| 4,517,637 A | 5/1985 | Cassell | |
| 2008/0081579 A1* | 4/2008 | Chen | H04W 4/00 455/187.1 |

(Continued)

FOREIGN PATENT DOCUMENTS

| DE | 10 2010 040 054 A1 | 3/2012 |
| GB | 2 420 423 A | 5/2006 |

(Continued)

OTHER PUBLICATIONS

Search Report for Application No. GB1717423.6, dated Apr. 19, 2018.
(Continued)

*Primary Examiner* — Glenn A. Auve
(74) *Attorney, Agent, or Firm* — Marshall, Gerstein & Borun LLP

(57) ABSTRACT

A modular control system includes a modular controller that implements control logic of the modular control system, where the controller is built natively on a platform of a distributed control system, equipment configured to perform a physical function in a process plant according to the control logic, and a configuration database storing configuration parameters of the modular control system. In a first mode of operation, the modular control system operates as a standalone module, and in a second mode of operation, the modular control system operates natively as one or several nodes of a distributed control system.

40 Claims, 41 Drawing Sheets

(52) U.S. Cl.
 CPC .............. *G05B 19/41855* (2013.01); *G05B 2219/1204* (2013.01); *Y02P 90/04* (2015.11); *Y02P 90/16* (2015.11); *Y02P 90/185* (2015.11); *Y02P 90/20* (2015.11); *Y02P 90/28* (2015.11)

(56) References Cited

U.S. PATENT DOCUMENTS

| | | | |
|---|---|---|---|
| 2008/0140870 | A1 | 6/2008 | Meyer et al. |
| 2011/0301725 | A1* | 12/2011 | Kline, Jr. ................ G05B 19/05 700/90 |
| 2012/0029661 | A1* | 2/2012 | Jones ................ G05B 19/0426 700/17 |
| 2012/0254339 | A1 | 10/2012 | Holmes |
| 2012/0296448 | A1* | 11/2012 | Balentine ........... G05B 19/0426 700/19 |
| 2015/0113662 | A1 | 4/2015 | Muller |
| 2015/0338837 | A1* | 11/2015 | Wagener ............. G05B 19/042 700/83 |
| 2016/0320762 | A1* | 11/2016 | Lutz ................... G05B 19/0426 |
| 2016/0359866 | A1* | 12/2016 | Mixer ..................... H04L 67/12 |
| 2018/0052683 | A1 | 2/2018 | Iguchi |

FOREIGN PATENT DOCUMENTS

| | | |
|---|---|---|
| JP | 2008-282362 A | 11/2008 |
| WO | WO-2016/151856 A1 | 9/2016 |

OTHER PUBLICATIONS

Search Report for Application No. GB1814880.9, dated Mar. 8, 2019.

* cited by examiner

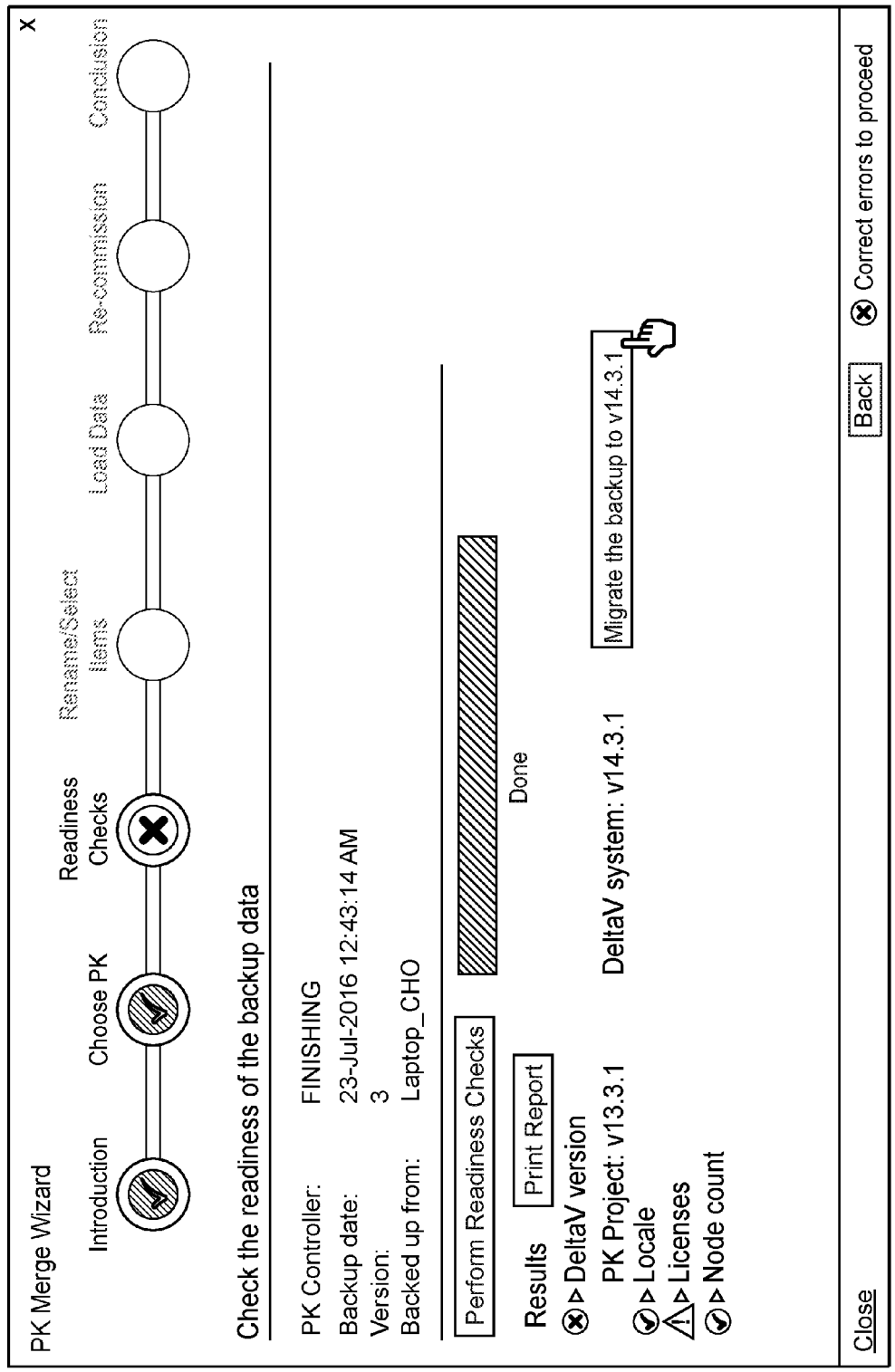

PK Merge Wizard

Introduction — Choose PK — Readiness Checks — Rename/Select Items — Load Data — Re-commission — Conclusion Modify names/tags and select what to load into DeltaV Prefix [All ▼] original names with these characters [          ] Apply prefix to original names ▼ Conflicting items

| Name | Configuration Type | Item Type | Group by: [No grouping ▼] Modified (backup) | Modified (DeltaV) | Comparison |
|---|---|---|---|---|---|
| SIGlobals.fxg | Graphics | Globals | 22-Jul-2016 10:11:12 AM | 11-Jan-2016 11:15:16 AM | Backup newer |
| User.fxg | Graphics | Globals | 21-Jun-2015 11:16:17 AM | 22-Jul-2016 12:17:18 PM | DeltaV newer |

▼ Non-Conflicting items

| Name | Configuration | Item Type | Group by: [No grouping ▼] Modified (backup) |
|---|---|---|---|
| XIC-1 | Logic | Control module | 22-Jul-2016 11:45:35 AM |
| HEADER1 | Logic | Equipment module | 23-Jul-2016 12:34:27 PM |
| FINISHING | Hardware | PK Controller | 23-Jul-2016 12:34:27 PM |

Close                                           Back    Next

*FIG. 6P*

PK Merge Wizard

Introduction — Choose PK — Readiness Checks — Rename/Select Items — Load Data — Re-commission — Conclusion Modify names/tags and select what to load into DeltaV Prefix [Module ▶] original names with these characters [        ] [Apply prefix to original names]

▼ Conflicting items Group by: [No grouping ▶]

| Name | Configuration Type | Item Type | Modified (backup) | Modified (DeltaV) | Comparison |
|---|---|---|---|---|---|
| SIGlobals.fxg | Graphics | Globals | 22-Jul-2016 10:11:12 AM | 11-Jan-2016 11:15:16 AM | Backup newer |
| User.fxg | Graphics | Globals | 21-Jun-2015 11:16:17 AM | 22-Jul-2016 12:17:18 PM | DeltaV newer |

▼ Non-Conflicting items Group by: [No grouping ▶]

| Name | Configuration | Item Type | Modified (backup) |
|---|---|---|---|
| XIC-1 | Logic | Control module | 22-Jul-2016 11:45:35 AM |
| HEADER1 | Logic | Equipment module | 23-Jul-2016 12:34:27 PM |
| FINISHING | Hardware | PK Controller | 23-Jul-2016 12:34:27 PM |

Close                                    Back    Next

PK Merge Wizard

Introduction — Choose PK — Readiness Checks — Rename/Select Items — Load Data — Re-commission — Conclusion Modify names/tags and select what to load into DeltaV Prefix [Module ▼] original names with these characters [PK-SKID123_]  [Apply prefix to original names]

▼ Conflicting items          Group by: [No grouping ▼]

| Name | Configuration Type | Item Type | Modified (backup) | Modified (DeltaV) | Comparison |
|---|---|---|---|---|---|
| SlGlobals.fxg | Graphics | Globals | 22-Jul-2016 10:11:12 AM | 11-Jan-2016 11:15:16 AM | Backup newer |
| User.fxg | Graphics | Globals | 21-Jun-2015 11:16:17 AM | 22-Jul-2016 12:17:18 PM | DeltaV newer |

▼ Non-Conflicting items     Group by: [No grouping ▼]

| Name | Configuration | Item Type | Modified (backup) |
|---|---|---|---|
| PK-SKID123_XIC-1 | Logic | Control module | 22-Jul-2016 11:45:35 AM |
| ⚠ PK-SKID123_HEADER1 | Logic | Equipment module | 23-Jul-2016 12:34:27 PM |
| FINISHING | Hardware | PK Controller | 23-Jul-2016 12:34:27 PM |

Close                                           Back   Next

*FIG. 6S*

PK Merge Wizard

Introduction — Choose PK — Readiness Checks — Rename/Select Items — Load Data — Re-commission — Conclusion Modify names/tags and select what to load into DeltaV Prefix ▶ original names with these characters PK-SKID123 ____ Apply prefix to original names ☑ Conflicting items Group by: [No grouping ▶]

| Name | Configuration Type | Item Type | Modified (backup) | Modified (DeltaV) | Comparison |
|---|---|---|---|---|---|
| SIGlobals.fxg | Graphics | Globals | 22-Jul-2016 10:11:12 AM | 11-Jan-2016 11:15:16 AM | Backup newer |
| User.fxg | Graphics | Globals | 21-Jun-2015 11:16:17 AM | 22-Jul-2016 12:17:18 PM | DeltaV newer |

⚠ ☑ Non-Conflicting items Group by: [No grouping ▶]

| | Configuration | Item Type | Modified (backup) |
|---|---|---|---|
| Name to long | Logic | Control module | 22-Jul-2016 11:45:35 AM |
| 16 character limit ⊂-1 | Logic | Equipment module | 23-Jul-2016 12:34:27 PM |
| ⚠ PK-SKID123_HEADER1 | Hardware | PK Controller | 23-Jul-2016 12:34:27 PM |
| 👆 FINISHING | | | |

Close                                                                          Back    Next

PK Merge Wizard

Introduction — Choose PK — Readiness Checks — Rename/Select Items — Load Data — Re-commission — Conclusion Modify names/tags and select what to load into DeltaV Prefix ▶ original names with these characters  PK-SKID123___  Apply prefix to original names ☑ Conflicting items  Group by: No grouping ▶

| Name | Configuration Type | Item Type | Modified (backup) | Modified (DeltaV) | Comparison |
|---|---|---|---|---|---|
| SIGlobals.fxg | Graphics | Globals | 22-Jul-2016 10:11:12 AM | 11-Jan-2016 11:15:16 AM | Backup newer |
| User.fxg | Graphics | Globals | 21-Jun-2015 11:16:17 AM | 22-Jul-2016 12:17:18 PM | DeltaV newer |

☑ Non-Conflicting items  Group by: No grouping ▶

| Name | Configuration | Item Type | Modified (backup) |
|---|---|---|---|
| PK-SKID123_XIC-1 | Logic | Control module | 22-Jul-2016 11:45:35 AM |
| PK-SKID123_HEADER1 | Logic | Equipment module | 23-Jul-2016 12:34:27 PM |
| FINISHING | Hardware | PK Controller | 23-Jul-2016 12:34:27 PM |

Back  Next

Close

FIG. 6V

PK Merge Wizard

Introduction — Choose PK — Readiness Checks — Rename/Select Items — Load Data — Re-commission — Conclusion

Select and load data

▼ Conflicting items

Group by: [No grouping ▶]

| Name | Configuration Type | Item Type | Modified (backup) | Modified (DeltaV) | Comparison |
|---|---|---|---|---|---|
| ☐ SIGlobals.fxg | Graphics | Globals | 22-Jul-2016 10:11:12 AM | 11-Jan-2016 11:15:16 AM | Backup newer |
| ☐ User.fxg | Graphics | Globals | 21-Jun-2015 11:16:17 AM | 22-Jul-2016 12:17:18 PM | DeltaV newer |

▼ Non-Conflicting items

Group by: [No grouping ▶]

| Name | Configuration | Item Type | Modified (backup) |
|---|---|---|---|
| ☑ PK-SKID123_XIC-1 | Logic | Control module | 22-Jul-2016 11:45:35 AM |
| ☑ PK-SKID123_HEADER1 | Logic | Equipment module | 23-Jul-2016 12:34:27 PM |
| ☑ FINISHING | Hardware | PK Controller | 23-Jul-2016 12:34:27 PM |

Close — Back — Next

*FIG. 6W*

PK Merge Wizard                                                                                              ✕

Introduction — Choose PK — Readiness Checks — Rename/Select Items — Load Data — Re-commission — Conclusion Load the data into the DeltaV system Load data into DeltaV          Loaded : 3 of 3

Progress/Results
Load from: C:\DeltaV\DvData\Import-Export\Finishing\Processed\
Log file: C:\DeltaV\DvData\Import-Export\Finishing\Processed\Load.log
Started: 7/22/2016 8:02:51 AM
FINISHING
PK-SKID123_XIC-1          PK Controller           New
PK-SKID123_HDR1           Control Module          New
                          Equipment Module        New
Item name changes. Use DeltaV Operate's Rename utility to make the corresponding name changes in graphics items.
XIC-1 ->        PK-SKID123_XIC-1
HEADER1 ->      PK-SKID123_HDR1

Ended: 7/22/2016 8:12:43 AM

Back    Next
Close

*FIG. 6Z*

SYSTEMS AND METHODS FOR MERGING MODULAR CONTROL SYSTEMS INTO A PROCESS PLANT

FIELD OF THE TECHNOLOGY

This disclosure relates generally to using modular control systems such as skid-mounted systems with process plants and, in particular, to efficiently integrating a modular control system into a process control system operating in a process plant.

BACKGROUND INFORMATION

Modular control systems, used today in a variety of industries, are complete control systems that can provide specific functionality, such as boiling water, filtering liquids, or controlling heat exchange. A modular control system typically is implemented as a skid-mounted system, or simply "skid," so called because the system is enclosed within a frame and is easily transported. A skid can be delivered to a factory as an integral unit, without being disassembled and reassembled, and typically preconfigured by the manufacturer. A skid generally includes a programmable logic controller (PLC), specialized equipment such as valves or boilers, and sensors such as pressure or temperature sensors, for example.

On the other hand, distributed control systems (DCS) also are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Devices operating in process control and industrial automation systems can be interconnected in a wired or wireless manner, and communicate using industrial communication protocols such as FOUNDATION™ Fieldbus, HART®, or Profibus. Further, protocols such as Modbus have been developed to interconnect PLCs. Still further, in addition to standard industrial automation protocols there exist proprietary protocols for interconnecting nodes in a process control system. DeltaV is an example of one such protocol. In general, these protocols specify formats for conveying measurements, alerts and status reports, commands that affect process variables or automation parameters, commands for activating or deactivating devices, etc. A typical industrial communication protocol also supports device configuration, via pre-defined commands or commands defined by manufacturers for specific devices in accordance with the syntax of the protocol.

While using skids equipped with PLCs is a popular approach to building a process control plant, PLCs today cannot be integrated natively into a large DCS. PLCs generally rely on proprietary protocols, configuration and security. At best, operators can use weak integration via Modbus or some other standard protocol to bring PLCs into a larger system. Weak integration is a manual process that does not withstand certain types of changes and requires manual maintenance as the system evolves.

For example, if a parameter mapping needs to be changed (i.e., an older parameter mapping needs to be removed and replaced with a new parameter mapping), not only does the mapping change but all logic referencing the old parameter must be updated as well, and all new logic must be written against the new parameter. Also, parameter mappings have practical or requirement-driven limitations (e.g., artificial limits set for business reasons). As a result, if more parameters that allowed or possible need to be mapped, some of the existing parameters need to be unmapped manually. The situation is even worse for the control logic running on skid-mounted systems. In this case, a completely different set of applications must be used to maintain the configuration of these devices. Often, the process to update them requires a laptop and a visit to the field to change or modify the logic. No centralized configuration is available for skids.

Particular to modular construction, it is possible to use build the plant in pieces and then assemble the pieces into a central repository. However, even if the software configuration and communication were compatible, merging the configuration into a single repository is a difficult and error-ridden manual process. Bringing two or three configurations into one involves importing, which is prone to go wrong. For example, if the naming plan contains an error, two modular pieces can be built with redundant tags, making the resulting configuration wrong. To resolve this problem, one or both need pieces to be renamed, and all references to these pieces need to be located, one by one, and updated. Moreover, when two pieces share a common resource, such as a name set, the resulting difficulty is even greater. One piece may change the other in a manner that is not immediately apparent. The resulting erroneous behavior sometimes is seen only later in production. Still further, modular construction also presents a problem with transportation. For example, putting pieces back on the network is difficult because these pieces will have conflicting IP addresses.

SUMMARY

A modular controller of this disclosure operates in a modular control system, such as a skid-mounted system, to execute the control logic of the modular control system independently of other controllers, similar to a PLC. When integrated into a distributed process control system, the modular controller can operate as one or multiple nodes of the distributed process control system. The configuration data of the modular controller is imported from the configuration database of the modular control system into the configuration database of the distributed process control system, which is a central repository of configuration data. In some implementations, the modular controller is built natively on the platform of the distributed process control system. The modular controller in this case can communicate with other nodes of the distributed process control system according to the communication protocol of the distributed process control system, which is proprietary in some implementations. In other implementations, the modular controller is integrated into a third-party distributed process control system, and communicates with the other nodes using a standard industrial communication protocol such as Modbus. Moreover, a merge assistant operates in a host such as a personal computer or an operator workstation to facilitate the merging of configuration data. The merge assistant can automatically identify conflicting configuration items, generate strings for modifying parameter names, generate warnings regarding conflicting configuration items as well as regarding configuration items that cannot be imported into the central repository but nevertheless should persist in the modular control system. The merge assistant also can automatically check licenses, nodes, versions, etc.

One example embodiment of these techniques is a modular control system configured to operate as a standalone module in a first mode of operation, or one or several nodes of a distributed control system in a second mode of operation. The modular control system includes equipment configured to perform a physical function in a process plant, a modular controller, and a configuration database storing configuration parameters of the modular control system. The controller is built natively on a platform of a distributed control system. In the first mode of operation, the modular controller implements control logic of the modular control system to operate the equipment. In the second mode of operation, the modular control system operates natively within the distributed control system as one or several nodes.

In various implementations, the modular control system also includes one or more of the following features. To operate natively, the modular controller shares at least one software layer with a controller operating in the distributed control system. The modular control system implements a proprietary communication protocol of the distributed control system. The modular control system is a skid-mounted system, where the equipment, the modular controller, and the configuration database are housed within a frame transportable as a single unit. Configuration data of the modular control system includes a first subset that is imported into a centralized configuration database of the distributed control system, and a second subset that is not imported into the centralized configuration database but is used by the modular control system in the second mode of operation. The modular controller supports includes a first address defined according to a scheme of the distributed control system and a second address defined according to a scheme of the modular control system, where the modular controller is addressable using the first address from other nodes of the distributed control network, and addressable using the second address from a node that supports a proprietary protocol of the modular control system. In this case, the proprietary protocol of the modular control system can be different from a protocol of the distributed control system.

Another embodiment of these techniques is a distributed process control system including a centralized configuration database storing configuration parameters of the distributed control system, a first controller that implements at least a portion of control logic of a distributed control system and a second controller that implements control logic of a modular control system, where the modular control system is configured to operate independently of the distributed control system in a first mode of operation, and where the modular control system corresponds to one or several nodes of the distributed control system in a second mode of operation. The first controller and the second controller share a software layer that specifies one or more of (i) a configuration procedure, (ii) a security mechanism, or (iii) a communication protocol.

Another embodiment of these techniques is a method of integrating a modular control system into a distributed control system, where nodes of the distributed control system communicate via a local area network. The method includes iteratively detecting modular control systems communicatively coupled to the local area network and, for each detected modular control system, (i) retrieving configuration data from the modular control network, (ii) identify configuration items that are conflicting with configuration items at other nodes of the distributed communication network, (iii) modify the conflicting configuration items to resolve conflicts with configuration items at the other nodes, and (iv) update the configuration data of the modular control network so that the modular control network can operate as one or several nodes of the distributed control system.

In various implementations, the method also includes one or more of the following acts: in response to detecting the modular controller, automatically checking at least one of licenses, nodes, version and locale of the modular controller; executing, on a computing device communicatively coupled to the local area network, a merge assistant that facilitates merging of configuration data of the modular control system to a centralized configuration data of the distributed control system; generating alphanumeric strings to modify names of the conflicting configuration items; identifying second configuration items that are conflicting configuration items at other nodes of the distributed communication network and, in response to determining that types of the second configuration items correspond to configuration items that persist in the modular control system, generating a warning; and decommissioning nodes of the modular control system, downloading modified configuration data into the modular control system, and re-commissioning the modular control system.

Yet another embodiment of these techniques is a non-transitory computer-readable medium that stores instructions that implement a merge assistant configured to facilitate integration of a modular control system into a distributed control system. When the computing device is coupled to a communication network of the distributed control system, the merge assistant is configured to detect a modular control system, retrieve configuration data from the modular control system, and generate a sequence of user interface screens to guide an operator during the integration, including generate at least one screen listing multiple configuration items in the configuration data of the modular control system that conflict with configuration data of the distributed control system.

Still another embodiment of these techniques is a computing devices including one or more processors and a non-transitory computer-readable medium storing instructions that implement a merge assistant as described above.

BRIEF DESCRIPTION OF THE DRAWINGS

FIG. 6A relates to initial operator instructions,

DETAILED DESCRIPTION

Figure 1:
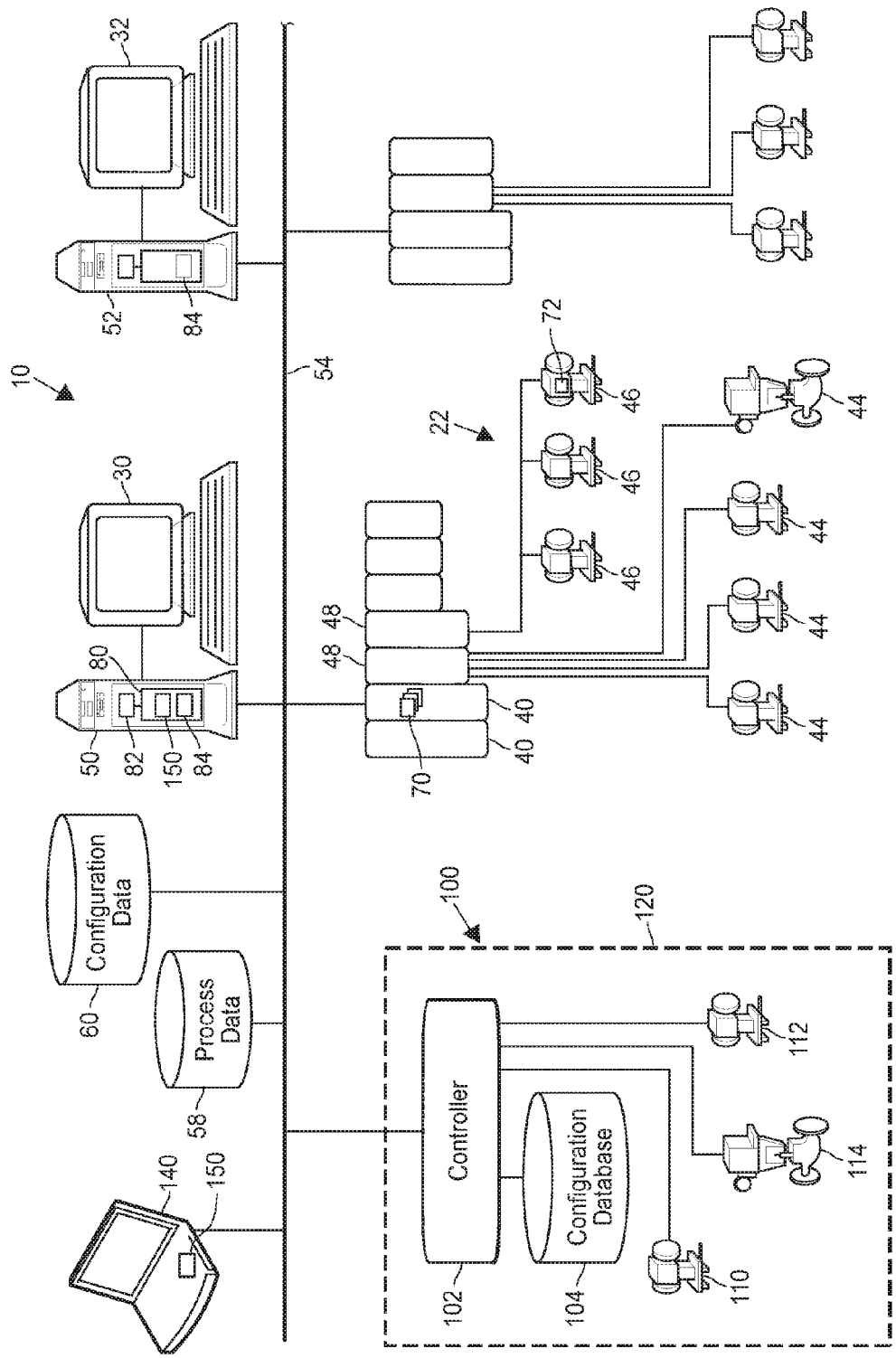
FIG. 1 is a block diagram of a distributed process control system into which an example modular control system is integrated.

Generally speaking, a modular control system of this disclosure includes a controller can operate as a standalone PLC, a controller of a skid-mounted system, or as a module in modular plant construction. The controller, referred to below as "modular controller," can be built natively on a platform such as DeltaV, which supports distributed control, so that the configuration, security mechanisms, and the communications of the modular controller are fully compatible with the DCS into which the modular controller is integrated. As a result, when the modular controller operates as one or several nodes in the DCS, the modular controller does not require the use of an industrial communication protocol to deliver data to the modular controller or to the sub-nodes of the modular controller, or receive data from the modular controller or its sub-nodes. Moreover, the configuration of the modular controller is compatible with a like-versioned full DCS system, which simplifies bringing of this configuration into a central repository of a DCS, referred to in this specification as "merging."

To facilitate merging, a software merge assistant operates as wizard on a standalone computing device or the workstation in a DCS. Upon connecting to a modular control system, the merge assistant identifies within the configuration data of the modular controller conflicting configuration items, non-conflicting configuration items, and configuration items that may be conflicting but should persist without attempted conflict resolution. The merge assistant also can automatically prepend a common strings to configuration items being imported into the central repository, to resolve multiple potential conflicts at the same time. Further, the merge assistant can eliminate the need to peruse logs and reduce the number of operations required to merge a modular control system into a process plant by generating grouped lists of conflicting and non-conflicting configuration items, and these lists via a user interface screen. The user can attend to all conflicting configuration items at a single step during integration, without the need to monitor conflicts reflected in the logs and resolving these conflicts on an ad hoc basis. The merge assistant also can perform licensing and version checks, as well as pre-verify node count.

Moreover, to prepend common strings to configuration items as discussed above, the merge assistant in some cases implements an algorithm that automatically prevents conflicts. For example, the algorithm can rely on unique device identifier(s) of device(s) from a modular control system. Alternatively, the algorithm can use the current time value to generate a unique identifier, or the algorithm can keep track of how many modular control systems have been integrated so far and assign consecutive numbers to each new modular control system being merged. The merge assistant also can in some cases determine user renaming intents based on the previous instances of manual renaming, and generate automatic renaming suggestions.

In some scenarios, a modular control system of this disclosure can be integrated into a process control system built on a different, possibly proprietary platform. In this case, the modular controller can communicate with the nodes of the process control system using an Open Platform Communication (OPC) communication protocol or a standard protocol such as Modbus. However, the merge assistant can communicate with the modular controller natively, e.g., using a DeltaV protocol if the modular controller is built on the DeltaV platform. To this end, the modular controller can support an address in the scheme of the process plant as well as a different address within a modular controller network.

In some implementations, the merge assistant can identify one or several modular control systems coupled to the local area network (LAN) of the plant, create a local storage of modular controller parameters (e.g., in the memory of the host on which the merge assistant executes), and sequentially merge each modular control system into the DCS. More specifically, for each modular control system, the merge assistant can import the configuration parameters into the local storage, facilitate modification of conflicting configuration items, and load the configuration items back into the configuration database of the modular control system. The merge assistant thus can facilitate decommissioning and subsequent re-commissioning of the modular control systems.

Further, the merge assistant in some cases can automatically detect redundancy in configuration and consolidate, or create shared classes, where appropriate. In this manner, the merge assistant can cause modular control systems to share the logic and/or code between control algorithms and shared system resources. Moreover, the merge assistant in this implementation can automatically combine or merge such redundancies as like-named sets or other shared resources.

Next, an example distributed process control system and an example modular control system, integrated into the distributed process control system, are discussed with reference to FIG. 1. Example provisioning of network addresses and configuration of nodes then are discussed with reference to FIGS. 2 and 3, respectively. Example methods for integrating modular control systems into larger process control systems are discussed with reference to FIGS. 4, 5A and 5B, followed by the discussion of the example user interface of a merge assistant that facilitates integration of a modular control system.

Example Systems

FIG. 1 illustrates an example process plant 10 that implements a distributed control system 22. As is typical, the distributed process control system 22 has one or more controllers 40, each connected to one or more field devices or smart devices 44 and 46 via input/output (I/O) devices or cards 48 which may be, for example, Fieldbus interfaces, Profibus interfaces, HART interfaces, standard 4-20 ma interfaces, etc. The controllers 40 are also coupled to one or more host or operator workstations 50, 52 via a data highway 54 which may be, for example, an Ethernet link or another link suitable local area network (LAN) link. A process data database 58 may be connected to the data highway 58 and operates to collect and store parameter, status and other data associated with the controllers and field devices within the plant 10. During operation of the process plant 10, the process data database 58 may receive process data from the controllers 40 and, indirectly, devices 44-46 via the data highway 54.

A configuration database 60 stores the current configuration of the process control system 22 within the plant 10 as downloaded to and stored within the controllers 40 and field devices 44 and 46. The configuration database 60 stores process control functions defining the one or several control strategies of the process control system 22, configuration parameters of the devices 44 and 46, the assignment of the devices 44 and 46 to the process control functions, and other configuration data related to the process plant 10. The configuration database 60 additionally may store graphical objects to provide various graphical representations of elements the process plant 10. Some of the stored graphical objects may correspond to process control functions (e.g., a process graphic developed for a certain PID loop), and other graphical objects may be device-specific (e.g., a graphic corresponding to a pressure sensor).

The process plant 10 also can include other database coupled to the data highway 54, not shown in FIG. 1 to avoid clutter. For example, a data historian can store events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository can store references, operator logbook entries, help topics, or links to these and other documentation that operators and maintenance technicians may find useful when supervising the process plant 10. Still further, a user database can store information about users such as the operator 12 and the maintenance technician 16. For each user, the user database can store, for example, his or her organizational role, an area within the process plant 10 with which the user is associated, work team association, etc.

Each of these databases can be any desired type of a data storage or collection unit having any desired type of memory and any desired or known software, hardware or firmware for storing data. Of course, the databases need not reside in separate physical devices. Thus, in some embodiments, some of these databases are implemented on a shared data processor. In general, it is possible to utilize more or fewer databases to store the data collectively stored and managed by the databases described above.

While the controllers 40, I/O cards 48 and field devices 44 and 46 are typically distributed throughout the sometimes harsh plant environment, the operator workstations 50 and 52 and the databases 58, 60, etc. are usually located in control rooms or other less harsh environments easily assessable by controller, maintenance, and various other plant personnel. However, in some cases, handheld devices may be used to implement these functions and these handheld devices are typically carried to various places in the plant.

As is known, each of the controllers 40, which may be by way of example, the DeltaV™ controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 40 may also support the AMS® Suite of applications and may use predictive intelligence to improve availability and performance of production assets including mechanical equipment, electrical systems, process equipment, instruments, field and smart field devices 44, 46, and valves.

In the plant 10 illustrated in FIG. 1, the field devices 44 and 46 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 46 in FIG. 1), may store and execute modules, or sub-modules, such as function blocks, associated with the control strategy implemented in the controllers 40. Function blocks 72, which are illustrated in FIG. 1 as being disposed in two different ones of the Fieldbus field devices 46, may be executed in conjunction with the execution of the control modules 70 within the controllers 40 to implement process control, as is well known. Of course, the field devices 44 and 46 may be any types of devices, such as sensors, valves, transmitters, positioners, etc. and the I/O devices 48 may be any types of I/O devices conforming to any desired communication or controller protocol such as HART, Fieldbus, Profibus, etc.

The workstations 50 and 52 can include one or more processors 82 that execute instructions stored in memory 80. The instructions can implement, in part, a viewing application 84 that provides various displays during operation of the process plant 10 to enable the operator 12 to view and control various operations within the process plant 10 or, as is common in larger plants, within a section of the process plant 10 to which the corresponding operator is assigned. The viewing application 84 may include, or cooperate with, support applications such as control diagnostic applications, tuning applications, report generation applications or any other control support applications that may be used to assist the operator 12 in performing control functions. Further, the viewing application 84 can permits a maintenance technician to supervise the maintenance needs of the plant 10, e.g., to view the operating or working conditions of various devices 40, 44, and 46. The viewing application also may include support applications such as maintenance diagnostic applications, calibration applications, vibration analysis applications, report generation applications or any other maintenance support applications that may be used to assist the maintenance technician 14 in performing maintenance functions within the plant 10.

With continued reference to FIG. 1, an example modular control system 100 includes a modular controller 102, a configuration database 104, and specialized equipment that can include field devices 110. The modular control system 100 can be a skid-mounted system in which the devices 102, 104, and 110-114 reside within a physical frame 120. The modular control system 100 can be configured to operate in a standalone mode and perform a relatively complex function in a plant, such as pump liquid in a controlled manner, heat water and maintain a certain temperature in a tank, perform a filtration function, etc. To this end, the modular control system 100 can include valves, tanks, sensors, etc.

The modular controller 102 can be built natively on the platform of the distributed control system 22. In other words, the modular controller 102 is developed specifically for use in the distributed control system 22, while also being capable of autonomous operation. To this end, the modular controller 102 can include firmware and/or software functions that does not require an intermediary (such as a porting/adaptation layer of firmware and/or software or the corresponding application programming interface (API) functions) to interact with the nodes of the distributed control system 22. The modular controller 102 in a certain software architecture shares one or more software layers with other controllers of the distributed control system 22. In any case, as native to the platform of the distributed control system 22, configuration, security mechanisms, and the communications of the modular controller 102 are fully compatible with the distributed control system 22.

The configuration database 104 can be stored on a non-transitory computer-readable memory such as a hard disk or a flash drive, for example. The computer-readable memory and the modular controller 102 can be provided as part of a single chipset of separately, depending on the implementation.

A manufacturer can assemble the modular control system 100, configure the parameters of the modular control system 100 with setpoint values and other parameter such as the gain value for a PID loop, names and tags for the field devices 110, licenses, locales, etc. The manufacturer also can configure parameter security. For example, the manufacturer can make the gain value a part of restricted control, and require that this value be changed only upon providing a proper key to unlock this variable. In some cases, the manufacturer can completely assemble the modular control system 100 for shipping as an integral unit.

As illustrated in FIG. 1, the modular control system 100 can be coupled to the plant 10 and the distributed control system 22 via the data highway 54. A host 140, which can be a laptop computer, for example, can execute a merge assistant 150. Alternatively, the merge assistant 150 in the operator workstation 150 or 152. In operation, the merge assistant 150 assists operators with efficiently and accurately merging configuration data from the configuration database 104 into the centralized configuration database 60. In some cases, the merge assistant 150 also generates automatic suggestions regarding renaming or relabeling items in the configuration database 104 to resolve conflicts with items in the configuration database 60. The merge assistant 150 then loads the updated configuration data into the configuration database 104. In some cases, the host 140 stores configuration data of the modular control system 100 while the configuration data is being updated.

According to another implementation, the merge assistant 150 distributes the new configuration data introduced by way of integrating modular control system into the distributed control system 22, thereby eliminating the need to import new data into the configuration database 60. In particular, rather than copying configuration data, the merge assistant 150 can update the configuration database 104 in situ with new tags to ensure uniqueness in the scope of the distributed control system 22. In this manner, the merge assistant 150 can reduce the time required to integrate a modular control system into a distributed control system, and in some cases may even provide "instant import."

Although FIG. 1 depicts only one modular control system 100, multiple modular control systems can be integrated into the distributed process control system 22. The merge assistant 150 in this case can detect modular control systems coupled to the data highway 54 and iteratively merge the corresponding configurations into the centralized configuration database 60.

Figure 2:
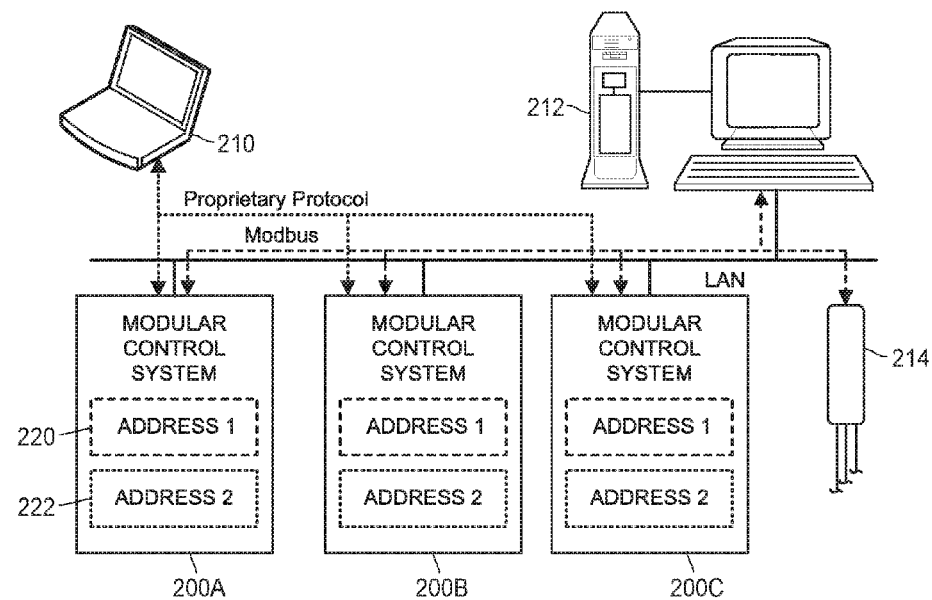
FIG. 2 is a block diagram of an example communication scheme between modular controllers, a host executing a merge assistant, and a host of a distributed process control system.

To more clearly illustrate an addressing scheme that a modular control system of this disclosure can implement, FIG. 2 depicts several example modular control systems 200A, 200B and 200C coupled to a LAN communication link 202. Also coupled to the communication link 202 are a host 210, an operator workstation 212 and various nodes of a distributed control system, represented in FIG. 2 by a controller 214. In some cases, the modular control systems 200A-C can be implemented similar to the modular control 100 of FIG. 1. Further, the components 202, 210, 212 and 214 can be implemented similar to components 54, 140, 50 and 40, respectively.

In this example implementation, the modular systems 200A-C include two network addresses. Each of the addresses 220 and 222 can be stored in a respective register, for example. The registers can reside in the modular controller 103 or in a separate memory unit, depending on the implementation. Using the address 220, the modular control system 200 for example can communicate with the host 210 as well as the modular systems 200B and 200C. Using the address 222, the modular control system 200 can communicate with the workstation 212 and the nodes of the distributed control system such as the controller 214. Both addresses 220 and 222 can be defined according to the Internet Protocol (IP) specification. However, in some implementations the addresses 220 and 222 are used with different communication protocols: in the example of FIG. 2, the host 210 communicates with the modular control systems 200A-C using a proprietary communication protocol such as DeltaV layered over IP, and the workstation 212 communicates with the nodes of the distributed control system using Modbus or a similar standard.

This configuration can be particularly advantageous where the distributed control system and one or several of the modular control systems 200A-C are provided by different parties, and where the workstation 212 does not support the proprietary protocol of the modular control system.

Figure 3:
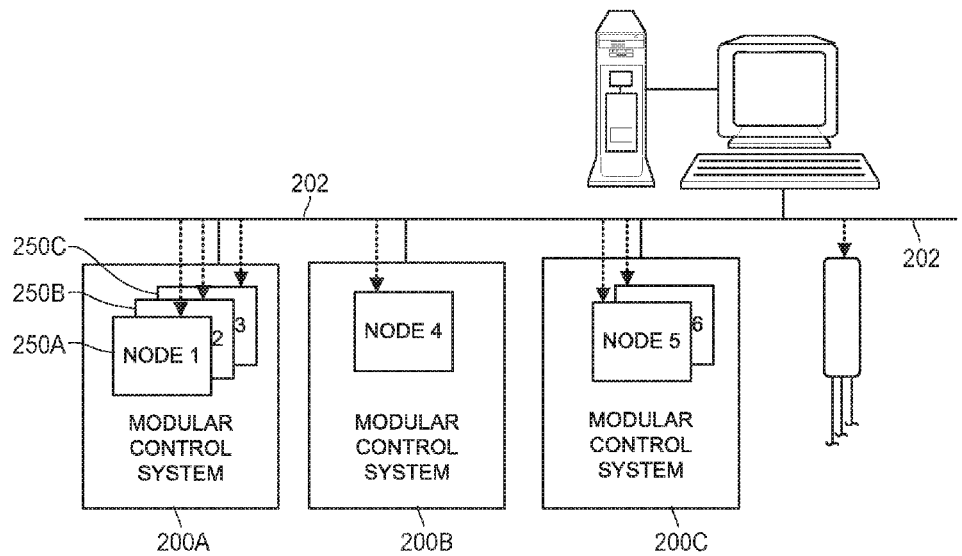
FIG. 3 is a block diagram of an example node configuration for modular systems integrated into a distributed process control system.

For additional clarity, FIG. 3 schematically illustrates that an example node configuration for a distributed control system into which several modular control systems 200A-C have been integrated. As illustrated in FIG. 3, each of the modular control systems 200A-C can implement one or several nodes of the distributed control system. For example, the modular control system 200A includes three nodes 250A, 250B and 250C, the modular control system 200B implements only one node, and the modular control system 200C implements only one node. Once the modular control systems 200A-C are integrated into the distributed control system, controllers and other devices in the distributed control system "see" the modular controllers of the modular control systems 200A-C as other nodes of the distributed control system rather than PLCs or other types of autonomous controllers.

Example Integration Methods

Figure 4:
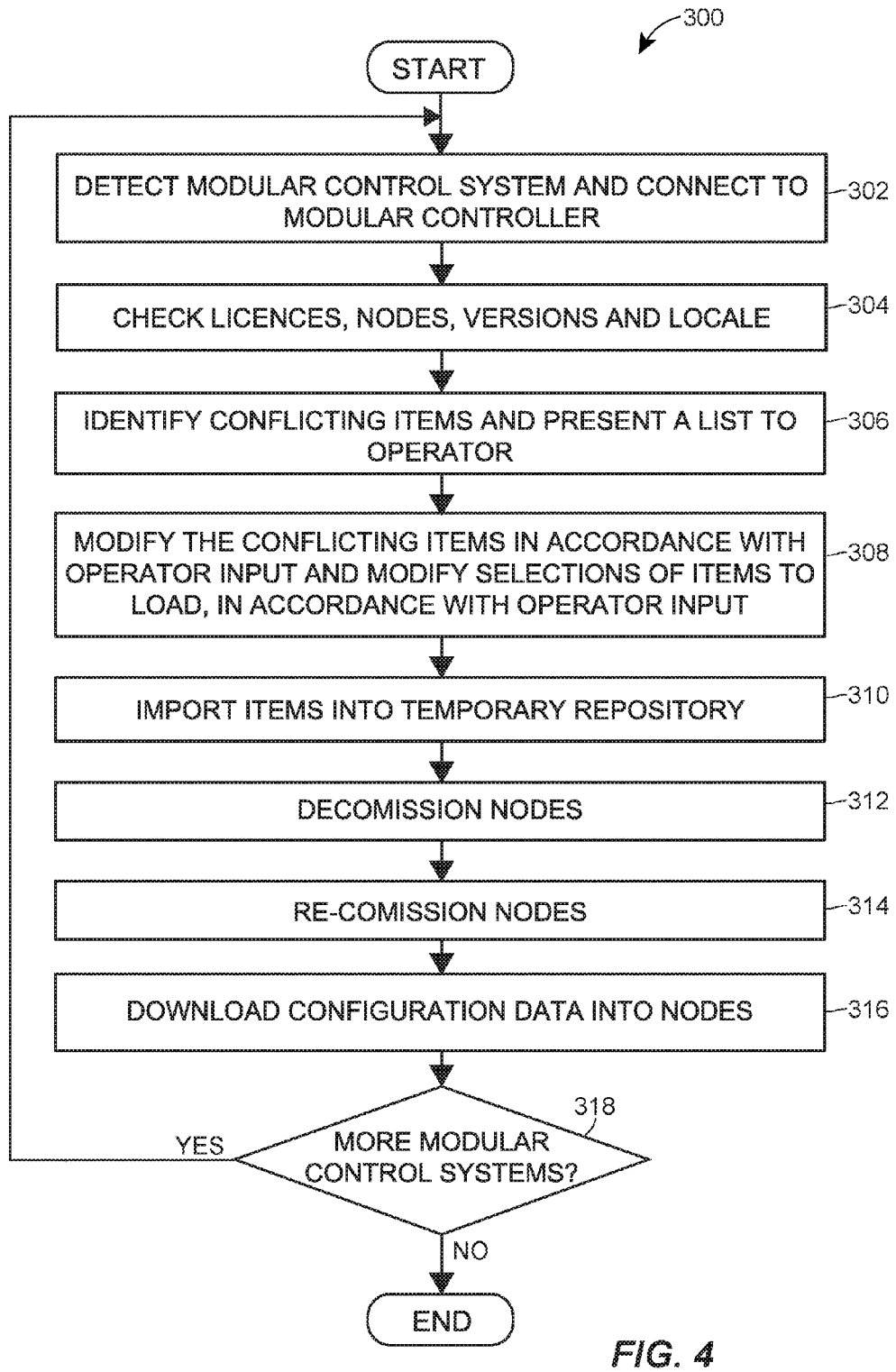
FIG. 4 is a flow diagram of an example method for integrating a modular control system into a process control system.

FIG. 4 is a flow diagram of an example method 300 for integrating a modular control system into a process control system. The method 300 can be implemented as a set of instructions stored on a computer-readable memory and executable by one or more processors. Although the method 300 can be implemented in any suitable device(s) and/or software task(s), by way of example this method is discussed below with reference to the merge assistant 150 of FIG. 1.

The method 300 begins at block 302, where the merge assistant 150 can detect a modular control system is detected. To this end, the merge assistant 150 can broadcast a certain command via the local area network using the communication protocol supported by the modular control systems and/or the protocol of the distributed control system. The merge assistant 150 then can establish a connection to the modular controller operating in the modular control system.

At block 304, the merge assistant 150 then can retrieve configuration data from the modular control system. The merge assistant 150 can check licenses, versions, nodes, locale, etc. to determine whether any problems with compatibility are likely to occur. More generally, the merge assistant 150 at block 304 can identify potential issues at the level of the modular control system rather than at the more specific level of individual items, as discussed below.

Next, at block 306, the merge assistant 150 can identify conflicting items. For example, a certain persistent graphics object "SIGlobals.fxg" in the configuration database of the modular control system can correspond to a different version of the same persistent graphics object already listed in the configuration database of the distributed control system. The merge assistant 150 can query the configuration database of the distributed control, identify this difference in versions as a potential conflict, generate an appropriate warning and, in some cases, provide appropriate controls for resolving the conflict by modifying the name of the object, for example. Example interface screens the merge assistant 150 can generate in these cases are further discussed below with reference to FIGS. 6A-6AI. In general, the merge assistant 150 can identify items of various configuration types (graphics, logic, hardware, etc.) and various specific types (e.g., control type or equipment module) as being in conflict with other items.

Further, the merge assistant 150 in some implementations can use a list of item types that specifies the appropriate action to be suggested when the merge assistant identifies a potential conflict. The list of items and corresponding actions can be implemented as a configuration file stored in the memory of the host that executes the merge assistant 150. In an example implementation, for a first set of item types the list specifies that the merge assistant 150 should automatically resolve the conflicts by prepending a certain string to the identifier of the item and generate an appropriate notification for the operator; for a second set of item types, the list specifies that the merge assistant 150 should automatically generate a notification without attempting to automatically resolve the conflict; for a third set of item types, the list specifies that the merge assistant 150 should list the corresponding items as non-conflicting and notify the operator that the corresponding item should be not imported into the centralized configuration database, etc.

One example of item type that can belong to the third set discussed above is parameter security. In an example scenario, the manufacturer of a modular control system applies a software lock to the gain reset rate parameter. The operator can change the value of this parameter by supplying the proper key locally via the user interface of the modular control system or by accessing the modular control system remotely via specialized user interface, for example, but it may be desirable to prevent this parameter from being modified via workstations of the distributed control system, after the modular control system has been integrated into the distributed control system. In other words, it may be desirable to retain independence of this parameter from the configuration of the distributed control system. The list of item types accordingly can indicate that there is no need to import this lock into the centralized configuration database of the distributed control system, and that this lock should not be superseded by configuration data of the distributed control system.

Still further, the merge assistant 150 in some implementations determines whether certain redundancies in logic can be merged and shared between nodes of the distributed control system. For example, if the modular control system includes a certain logic block which the merge assistant 150 also locates in the centralized configuration database under a different name, the merge assistant 150 in some cases can automatically suggest to the operator that he or she link the logic block to the modular control system (or perform the linking automatically, if desired).

With continued reference to FIG. 4, the merge assistant 150 then modifies the conflicting items in accordance with operator input (block 308). The merge assistant 150 also allows the operator to select which items should be loaded back into the modular control system once the configuration is completed.

At block 310, the merge assistant 150 can import the selected items into a temporary repository. For example, referring back to FIG. 1, the items can be stored in the memory of the host 140 or the workstation 50. The merge assistant 150 also can load these items into the centralized configuration database of the distributed control system (e.g., the database 60 of FIG. 1). Alternatively, the merge assistant 150 can load these items to the centralized configuration database only after successfully configuring the modular control system.

The merge assistant 150 then decommissions nodes of the modular control system at block 312, and re-commissions the nodes with the new configuration data at block 314. In some cases, the merge assistant 150 can re-commission more nodes than were configured in the modular control system. For example, the modular control system in a standalone mode could operate as a standalone PLC with a single node, but the same modular control system can operate as multiple nodes of the distributed control system. The merge assistant 150 can download the new configuration into the modular control system at block 316.

The merge assistant 150 can check whether there are other modular control systems on the local area network that require configuration. If one or more modular control systems are present, the flow returns back to block 302. The method 300 completes otherwise.

Figure 5A:
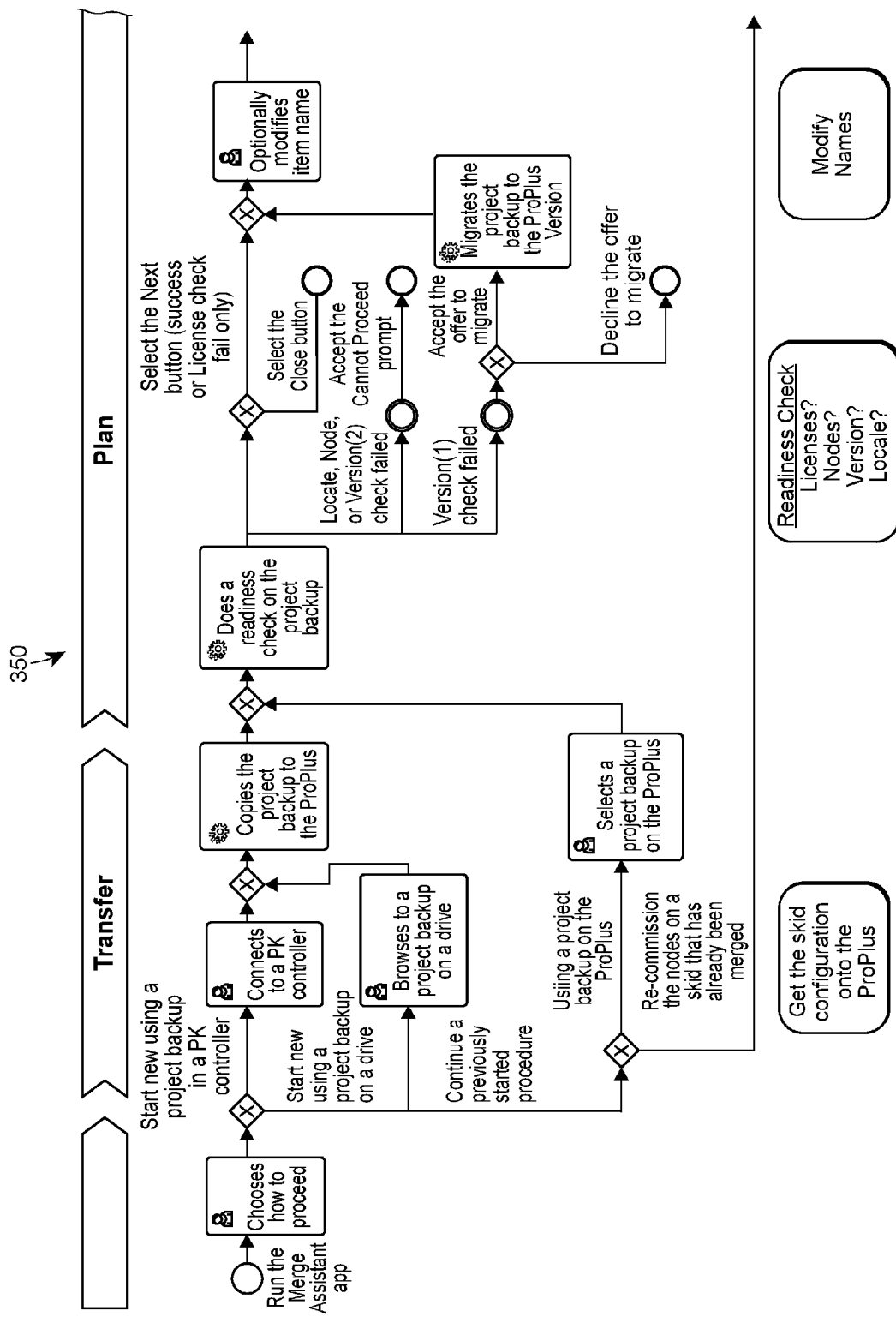
FIGS. 5A-5C are a more detailed flow diagram of the method of FIG. 4.
Figure 5B:
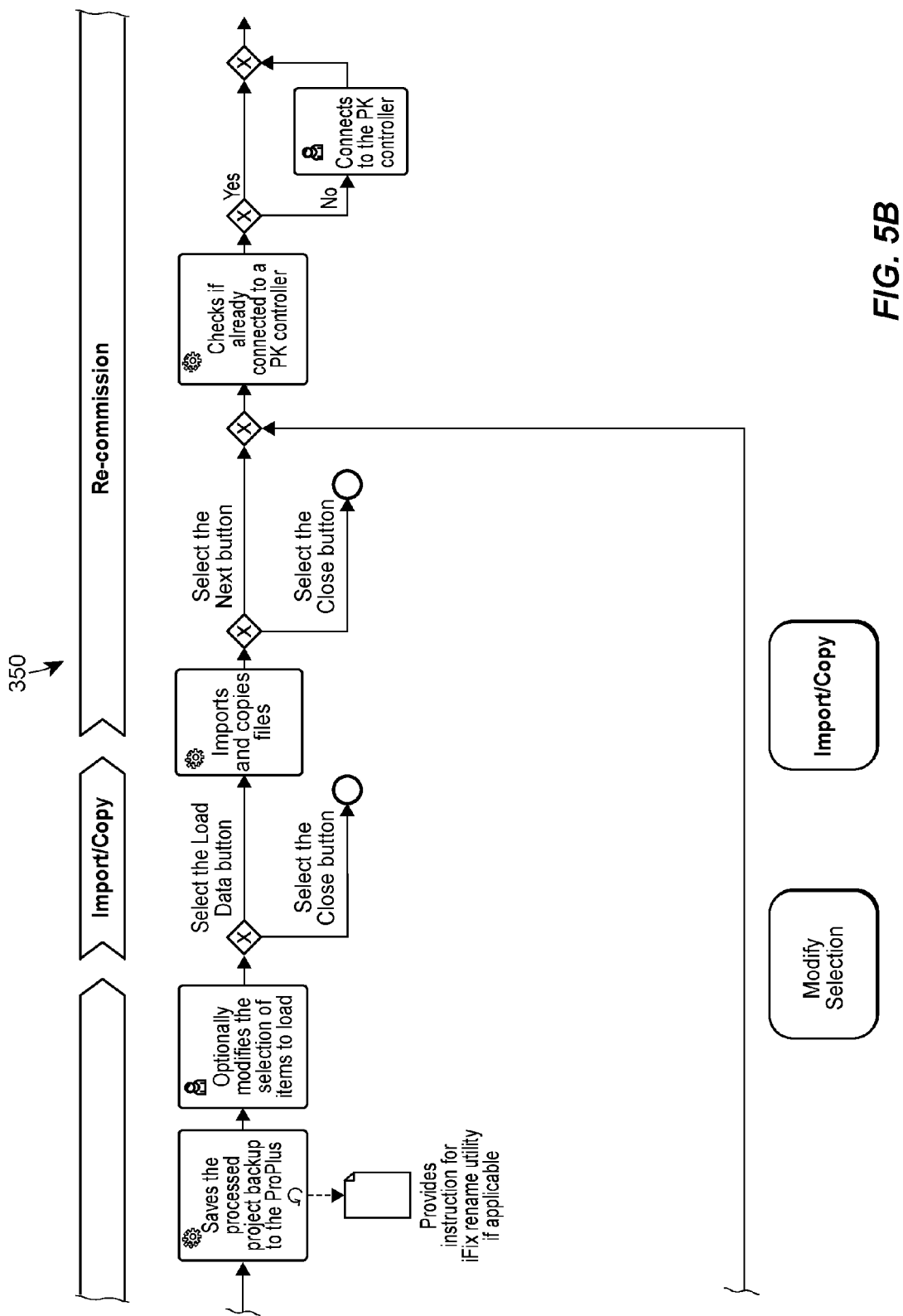
Figure 5C:
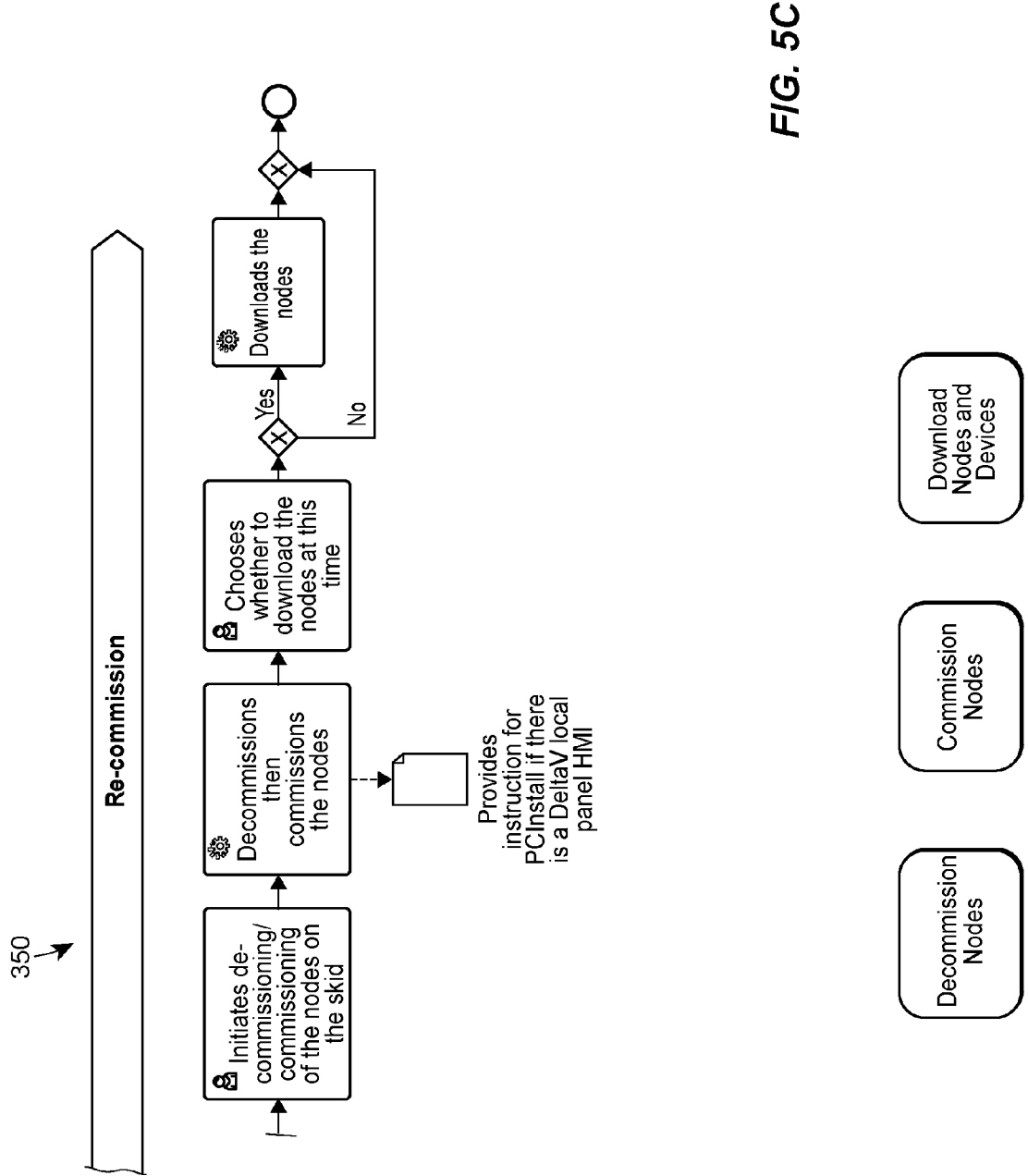

For further clarity, FIGS. 5A and 5B illustrate the technique for integrating a modular control system into a larger control network in more detail. According to these diagrams, the merge assistant 150 can guide an operator through transfer, planning, importing/copying, and re-commissioning. The term "ProPlus" refers to an example implementation of a software including the merge assistant 150 or a similar software module, implemented on a host equipped with a storage device. Boxes enclosing descriptions of various steps in FIGS. 5A and 5B are labeled with a person icon or a gear icon referring to manual and automatic operations, respectively. However, FIGS. 5A and 5B illustrate only an example division between manual and automatic operations.

Example User Interface of a Merge Assistant

Figure 6A:
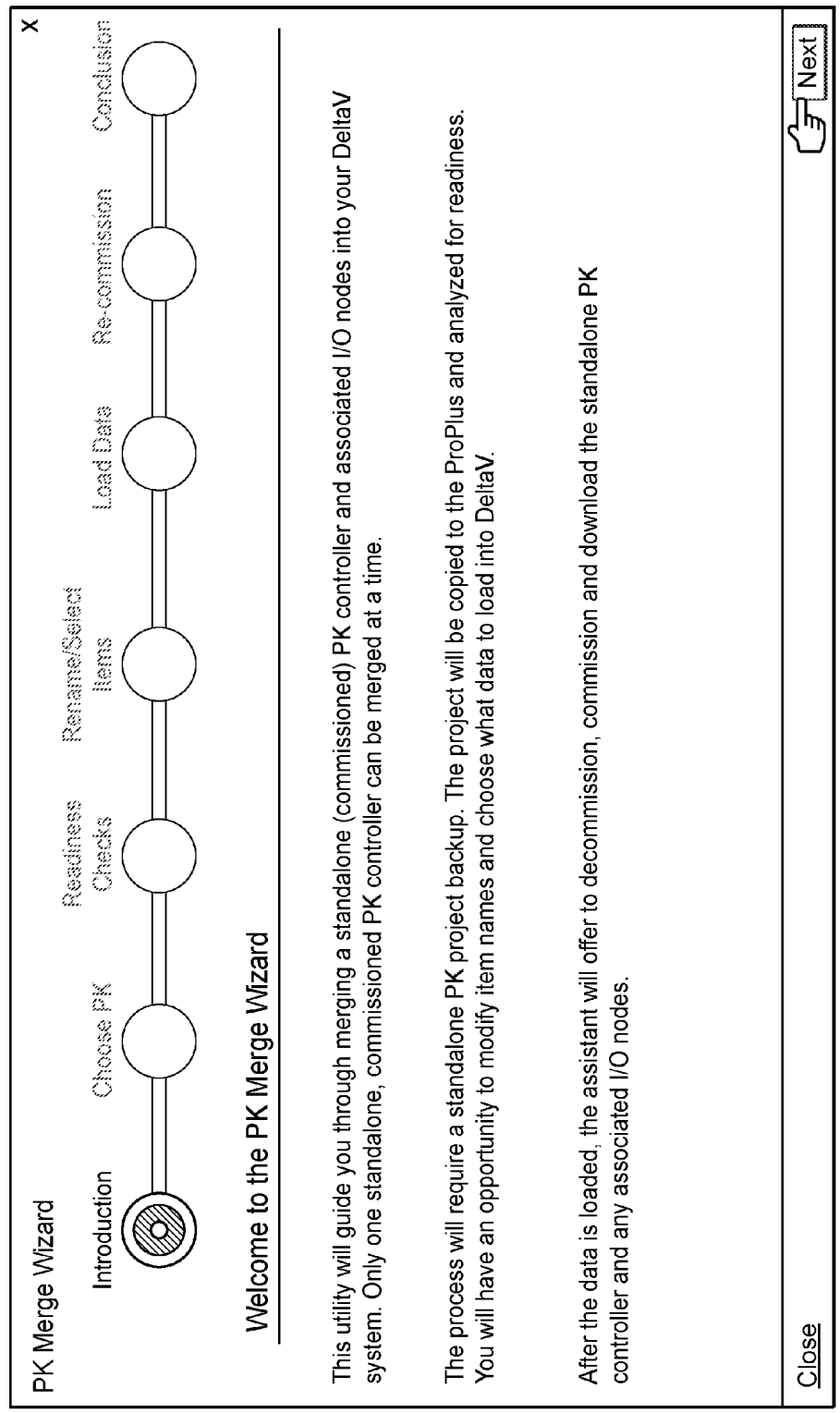
FIGS. 6A-6AI illustrates an example sequence of screenshots which the merge assistant can present to an operator when merging a modular control system into a distributed process control system. More particularly.

FIGS. 6A-6AI illustrates an example sequence of screenshots which a merge assistant can present to an operator when merging a modular control system into a distributed process control system. In these diagrams, the term "PK controller" refers to a modular controller such as the controller 102 illustrated in FIG. 1. For clarity, the screenshots of FIGS. 6A-6AI are discussed with reference to the merge assistant 150.

Figure 6B:
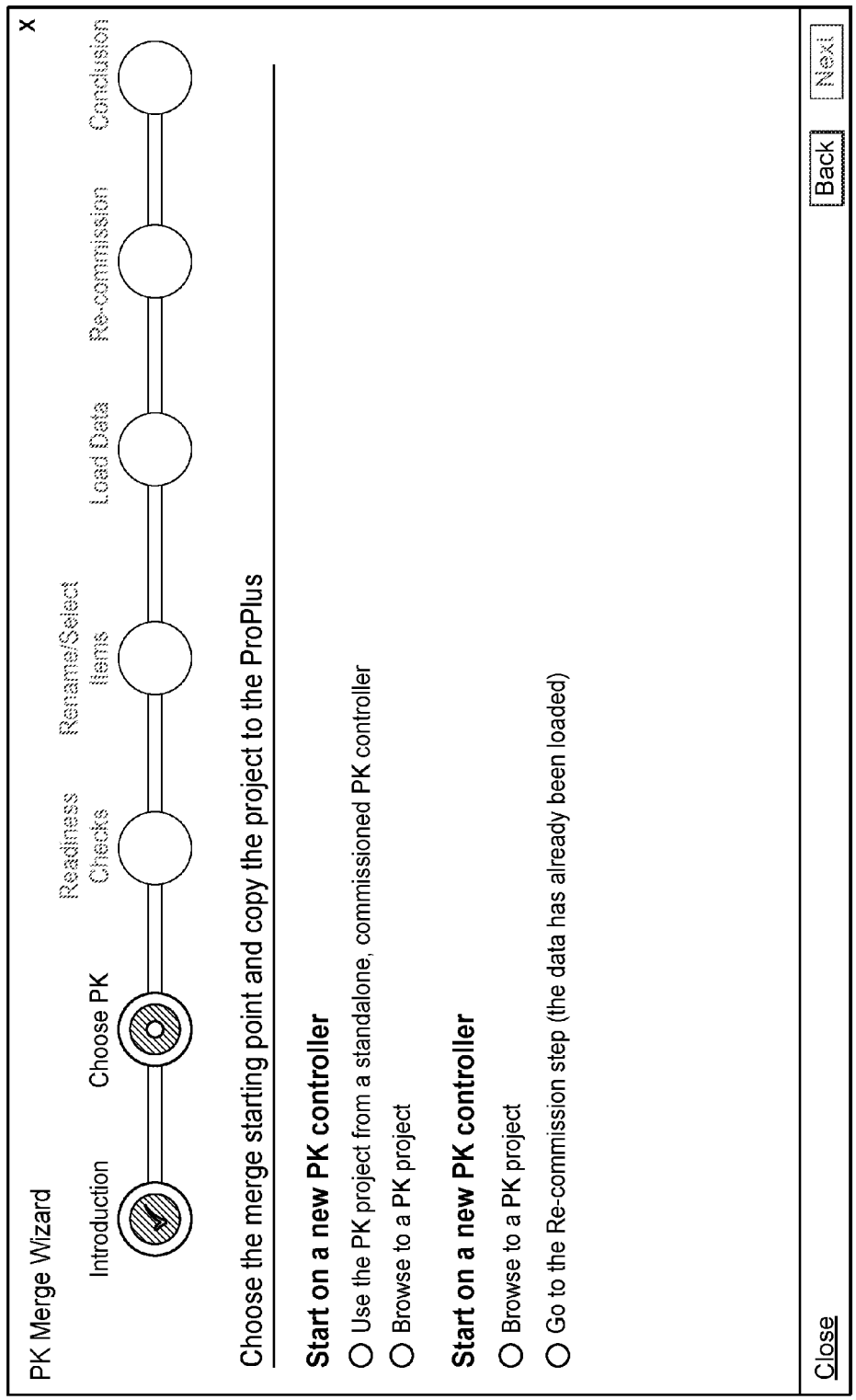
FIGS. 6B-H relate to the process of selecting a project.

The screenshot of FIG. 6A illustrates an entry screen that includes general instructions for the operator. As illustrated in FIG. 6B, the operator can choose to start a new project ("PK project" in these diagrams) of integrating a modular control system into a larger control system, continue creating a previously started project. When multiple modular control systems have been detected, the operator can select one of the detect one of these systems for integration.

Figure 6C:
Figure 6D:
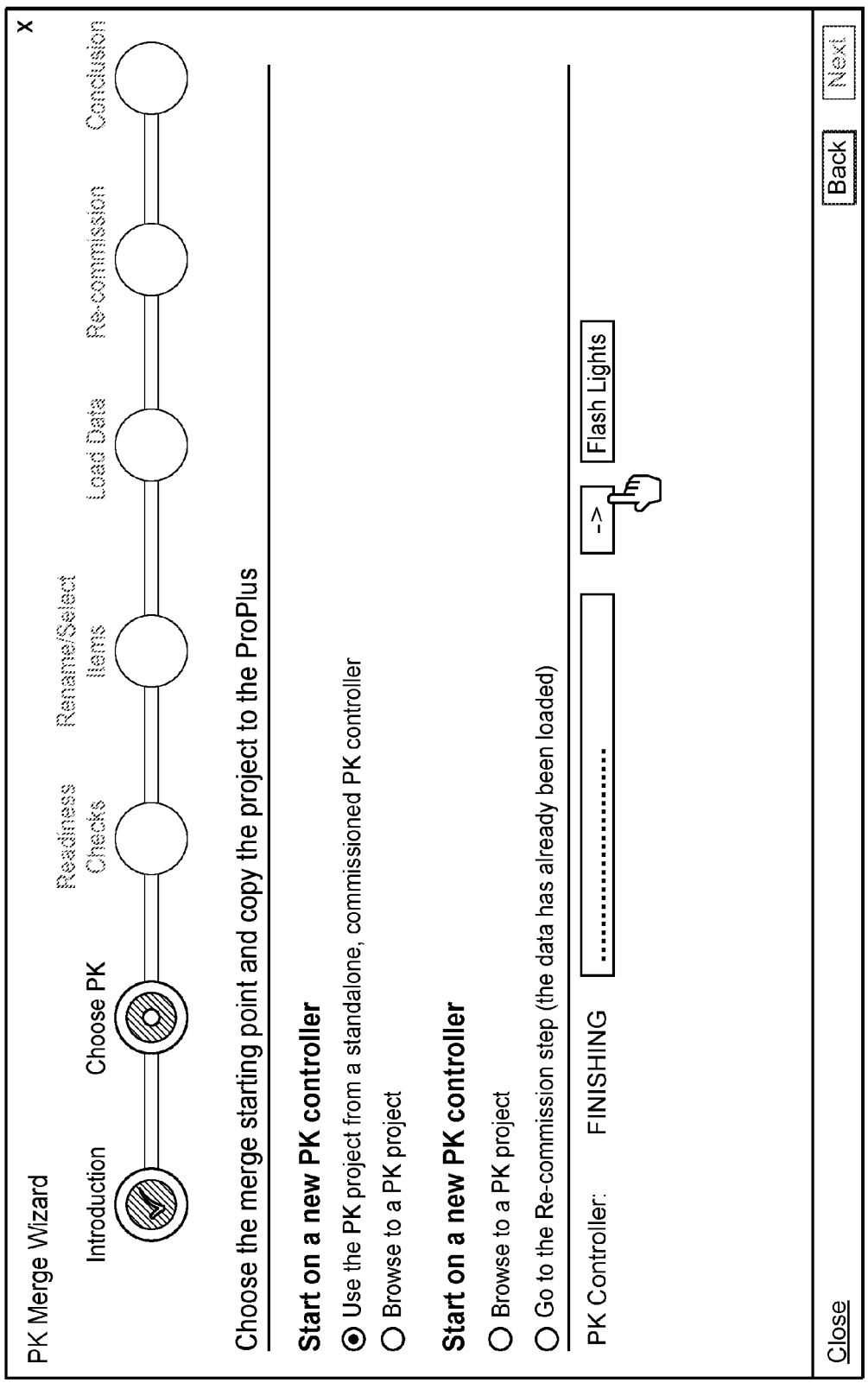
Figure 6E:
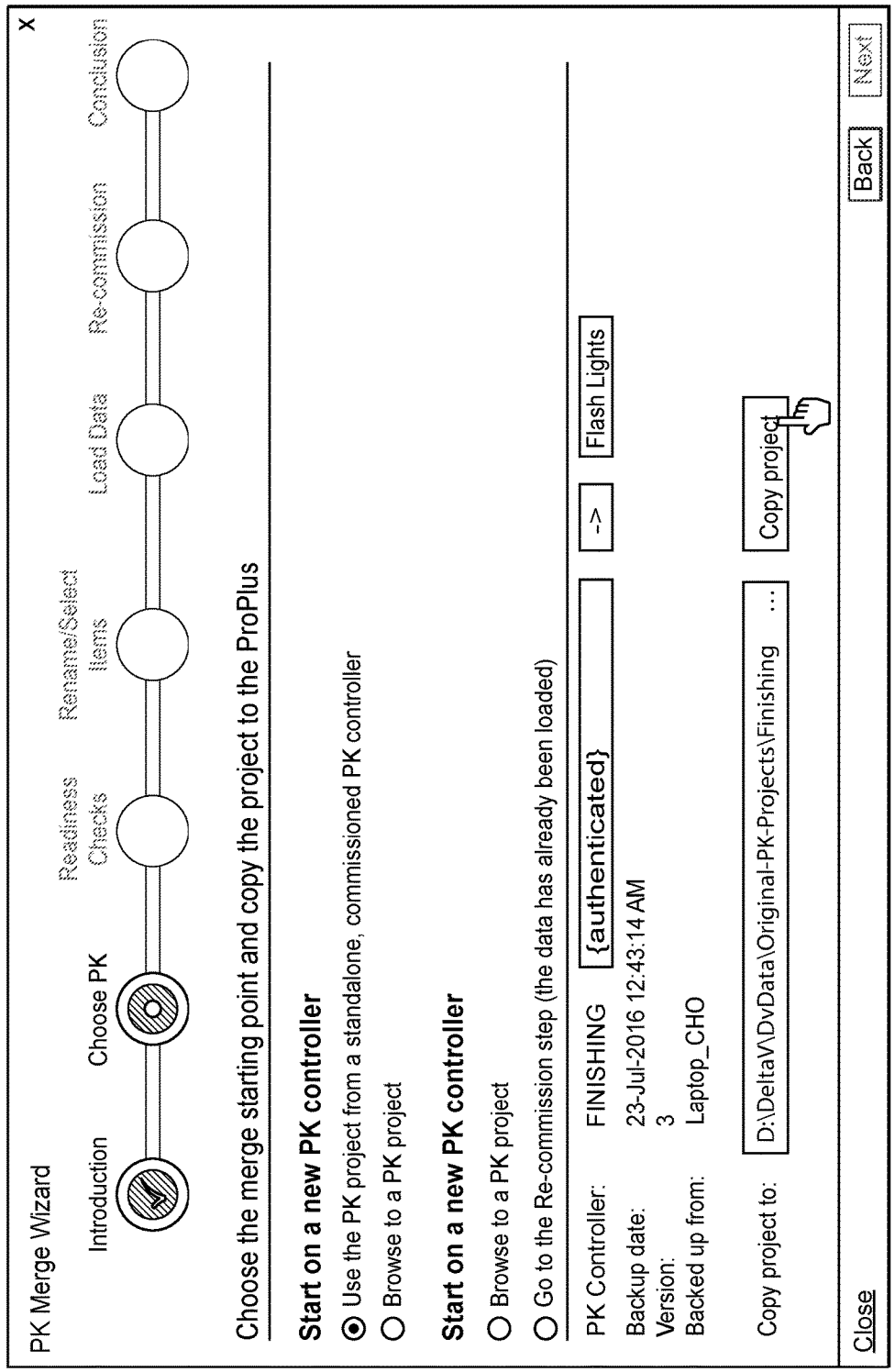
Figure 6F:
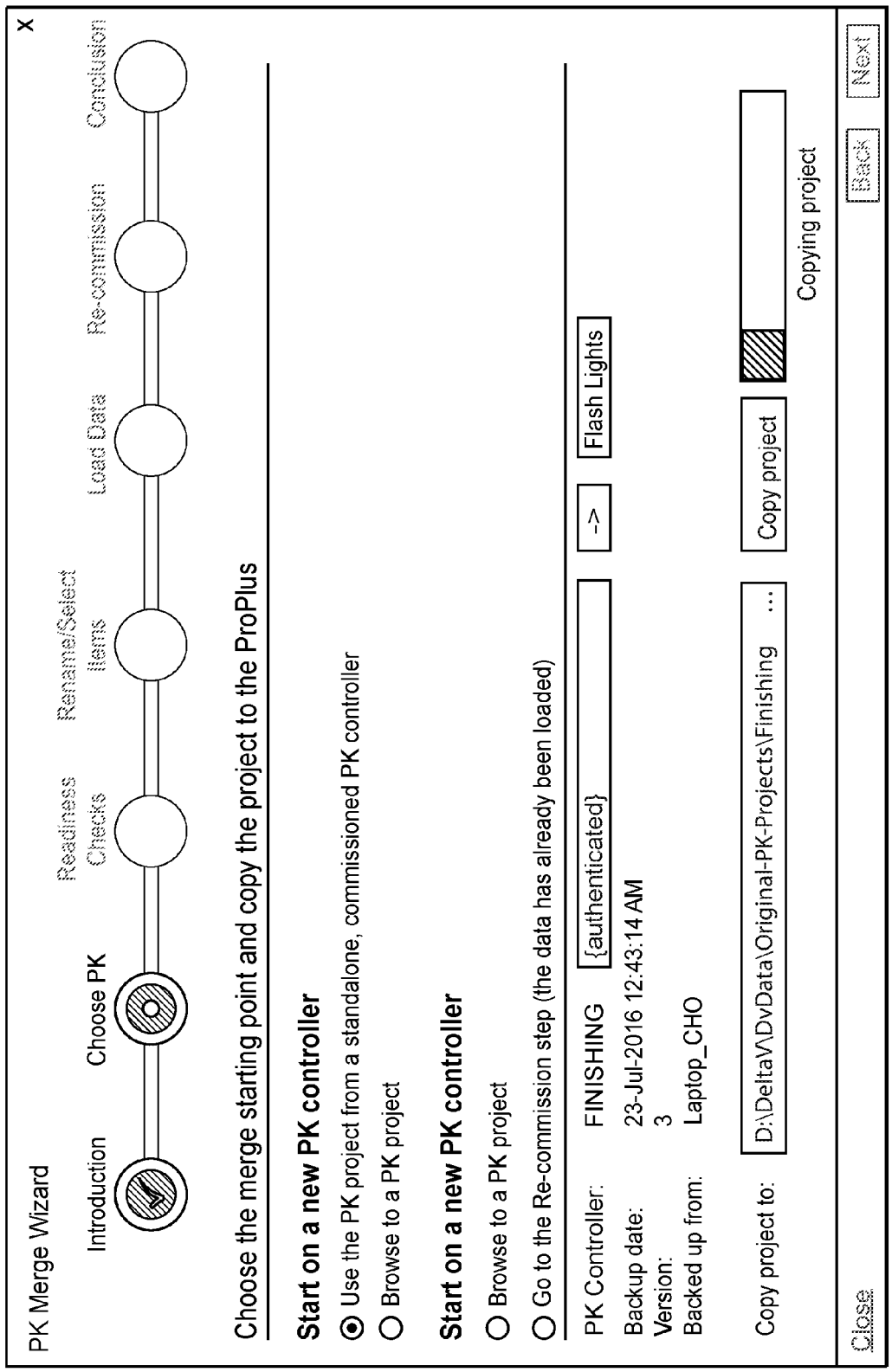
Figure 6G:
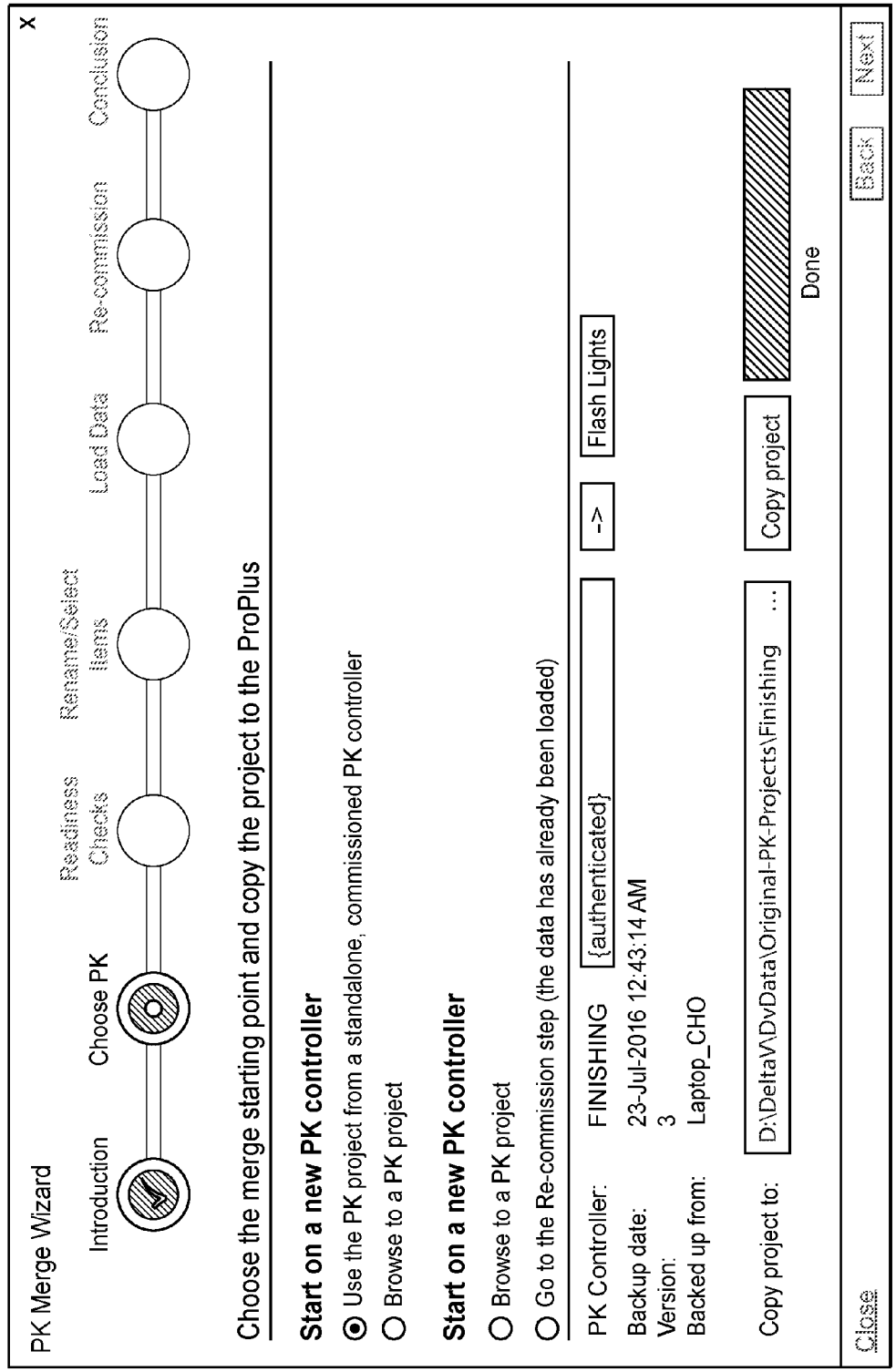

FIG. 6C illustrates a screenshot which the merge assistant 150 can display to receive authentication information from the operator to access the modular controller of a detected modular control system, where the operator chose to retrieve the project from a standalone, commissioned modular controller. Once the user enters authentication information (FIG. 6D), the merge assistant 150 can retrieve the project information from the modular control system, save the information to a desired location on a host (in this case, a certain laptop computer), and display the corresponding notifications (FIGS. 6E-G).

Figure 6H:
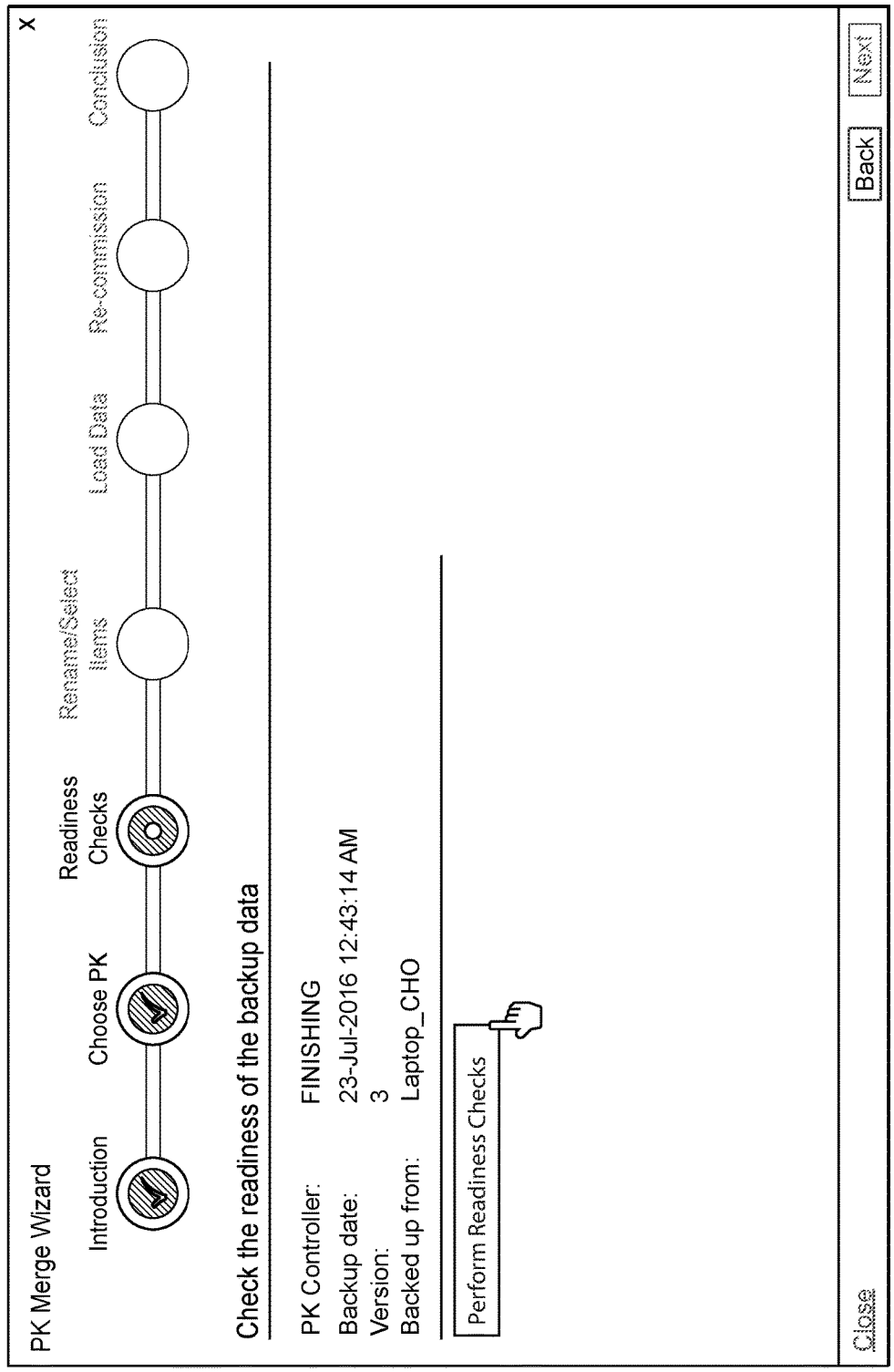
Figure 6I:
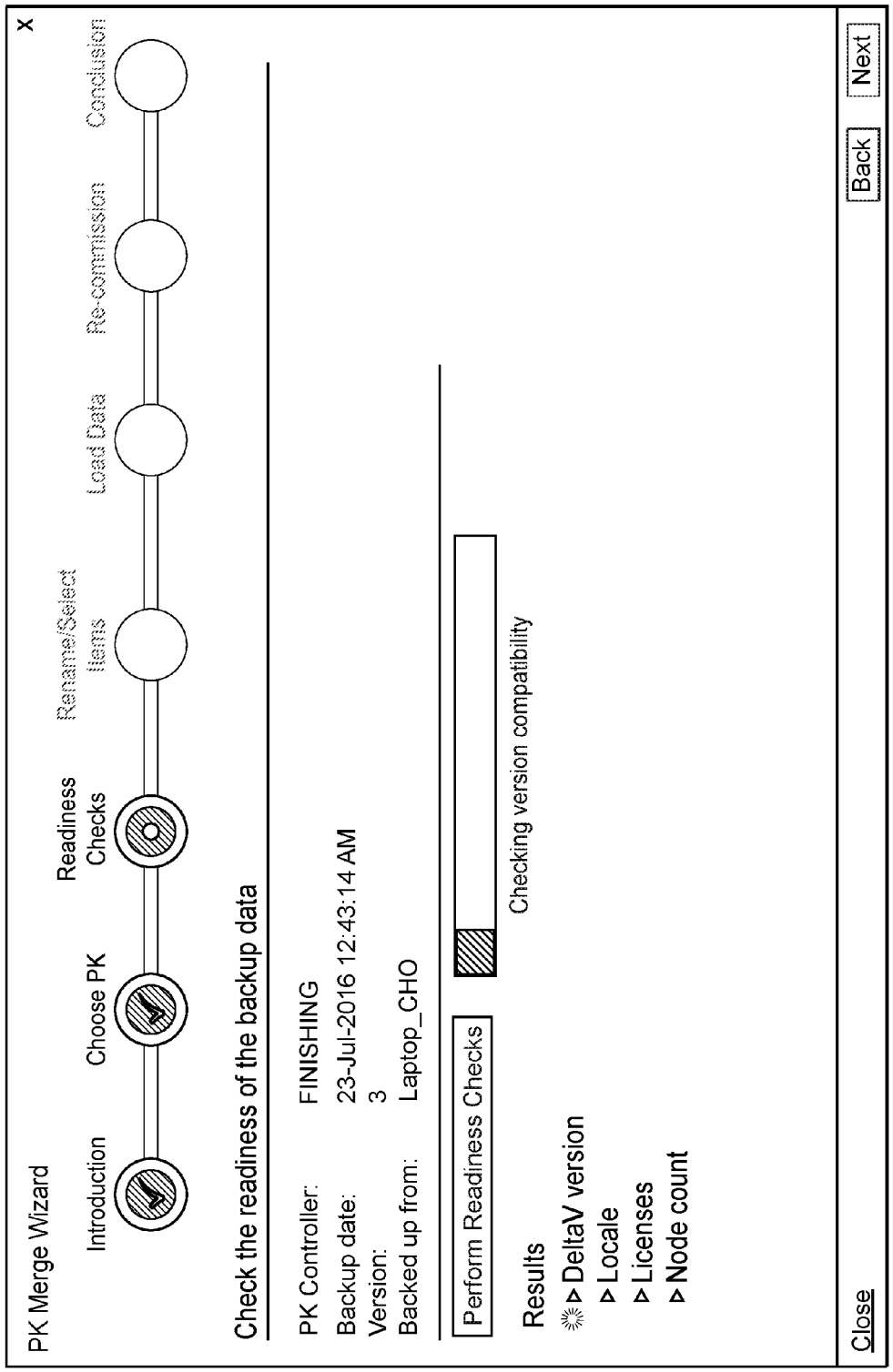
FIGS. 6I-O relate to performing readiness checks.
Figure 6J:
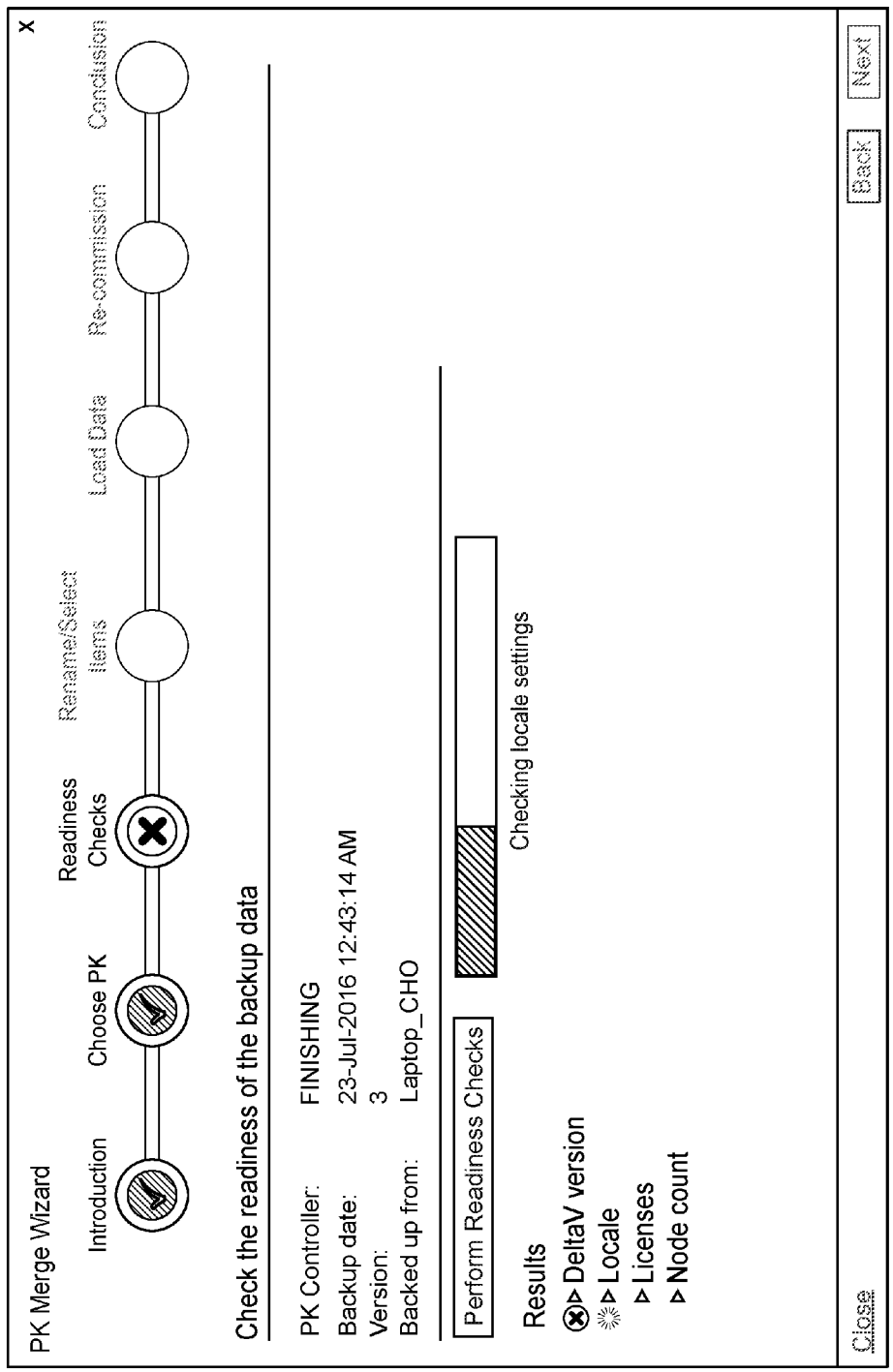

Now referring to FIG. 6H, the merge assistant 150 can provide an operator control for performing readiness checks. Once the operator actuates this control, the merge assistant 150 can check version compatibility by accessing the centralized configuration database and possibly other nodes of the of the distributed control system, and comparing this configuration data to the configuration data retrieved from the modular control system. The merge assistant 150 then can generate an interactive list of the results of checking version compatibility, organized by categories such as version, locale, licenses, node count, etc. (FIGS. 6I, 6J).

Figure 6K:
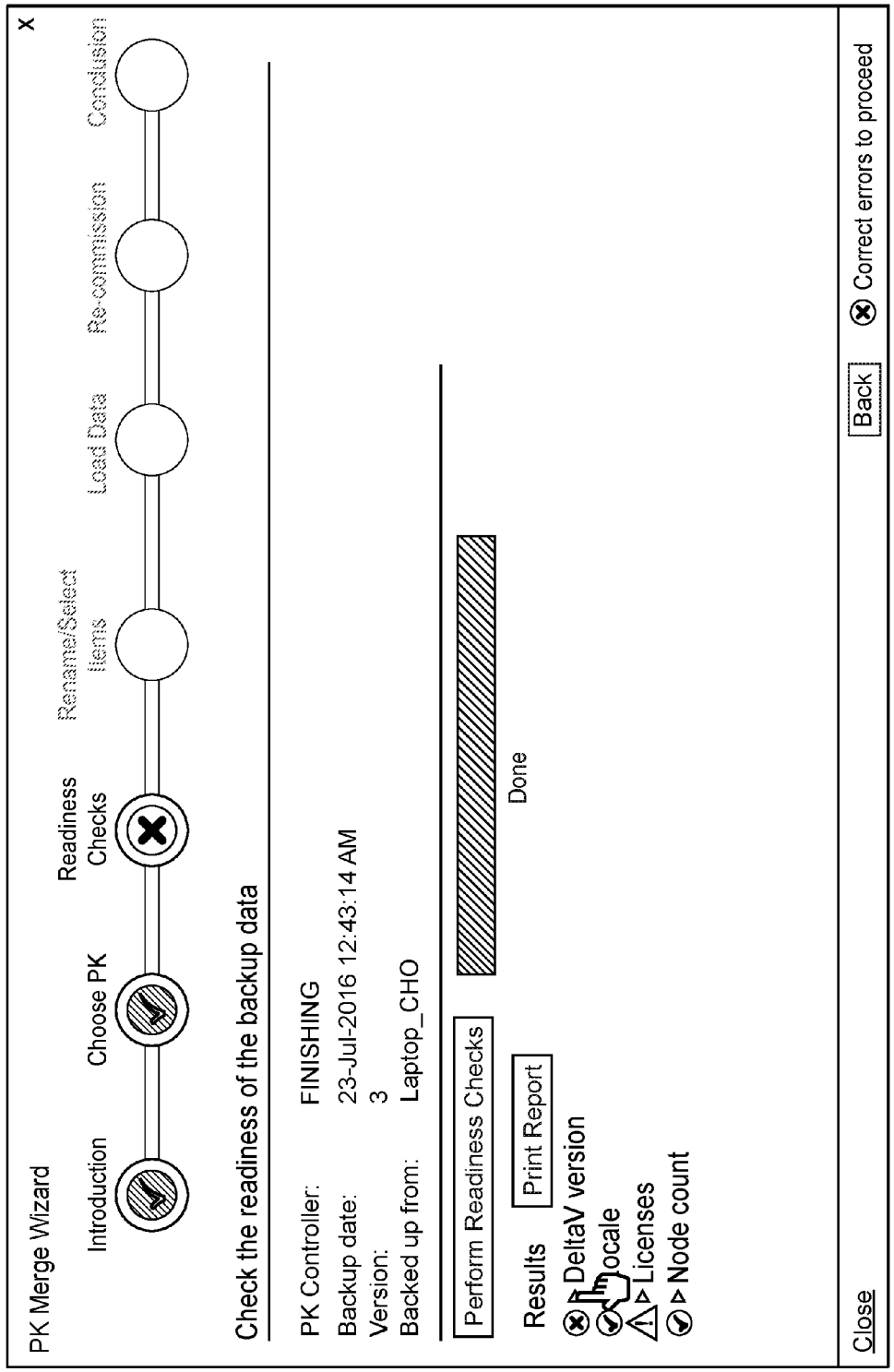
Figure 6M:
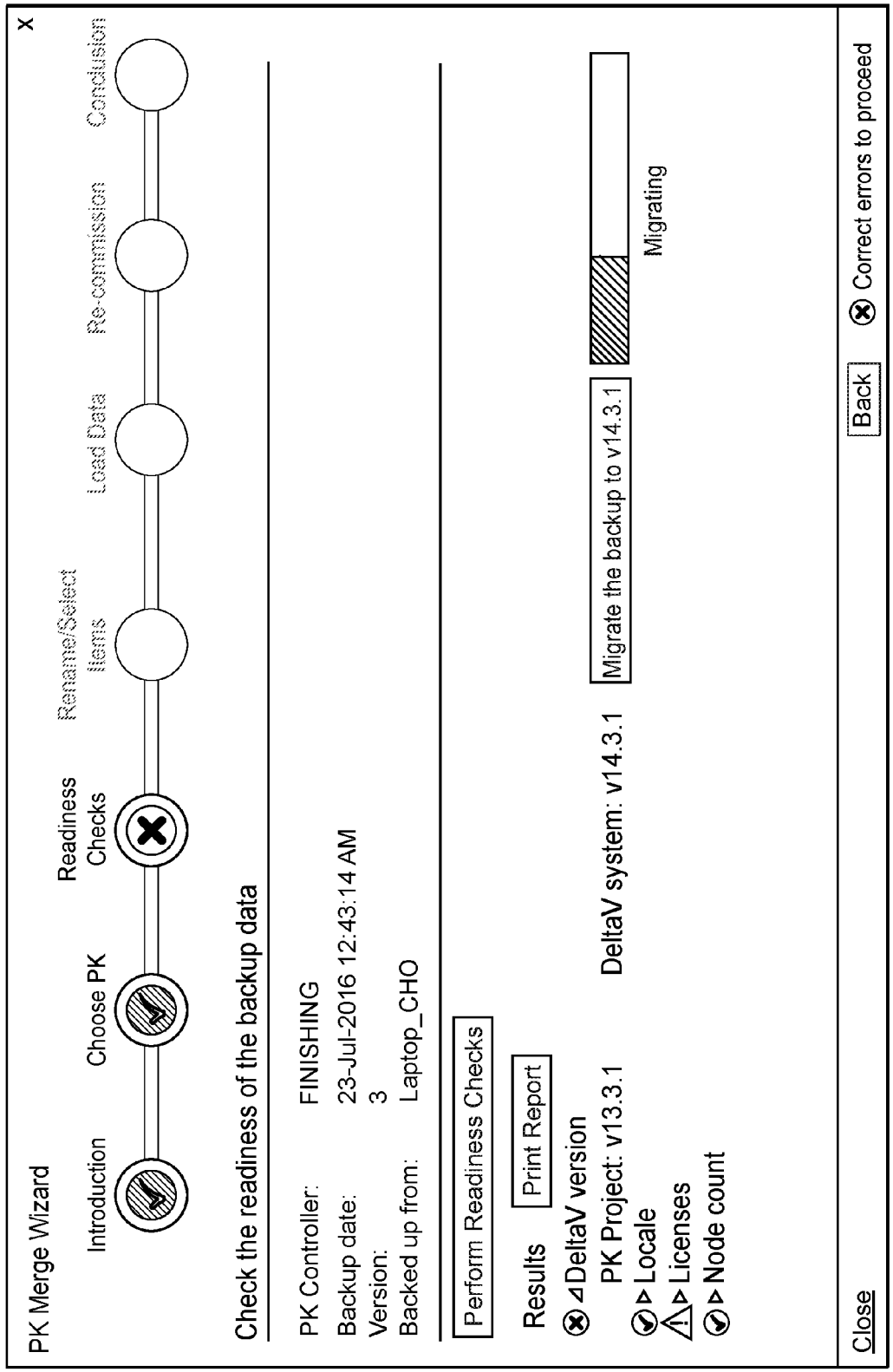
Figure 6N:
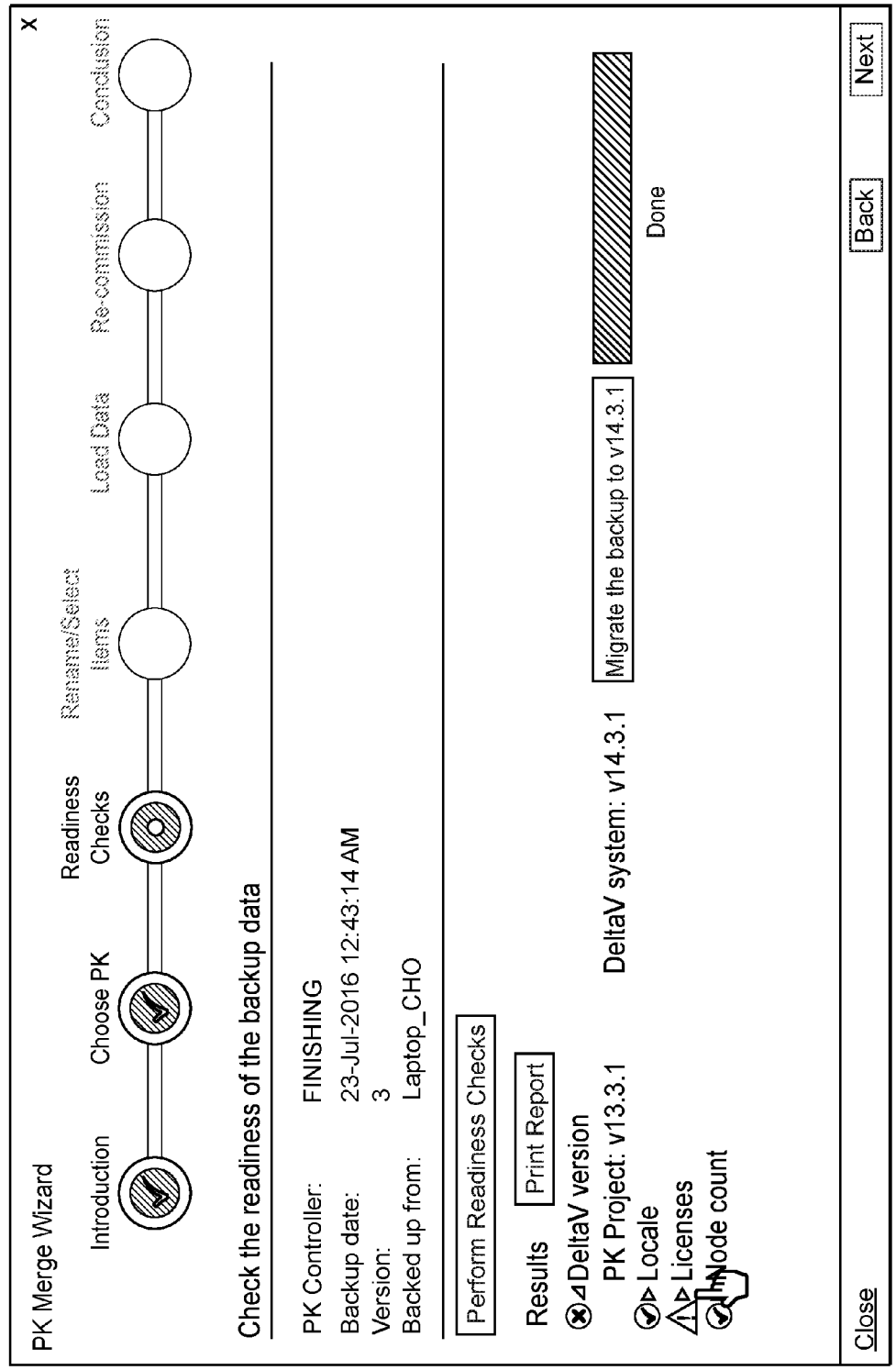
Figure 60:
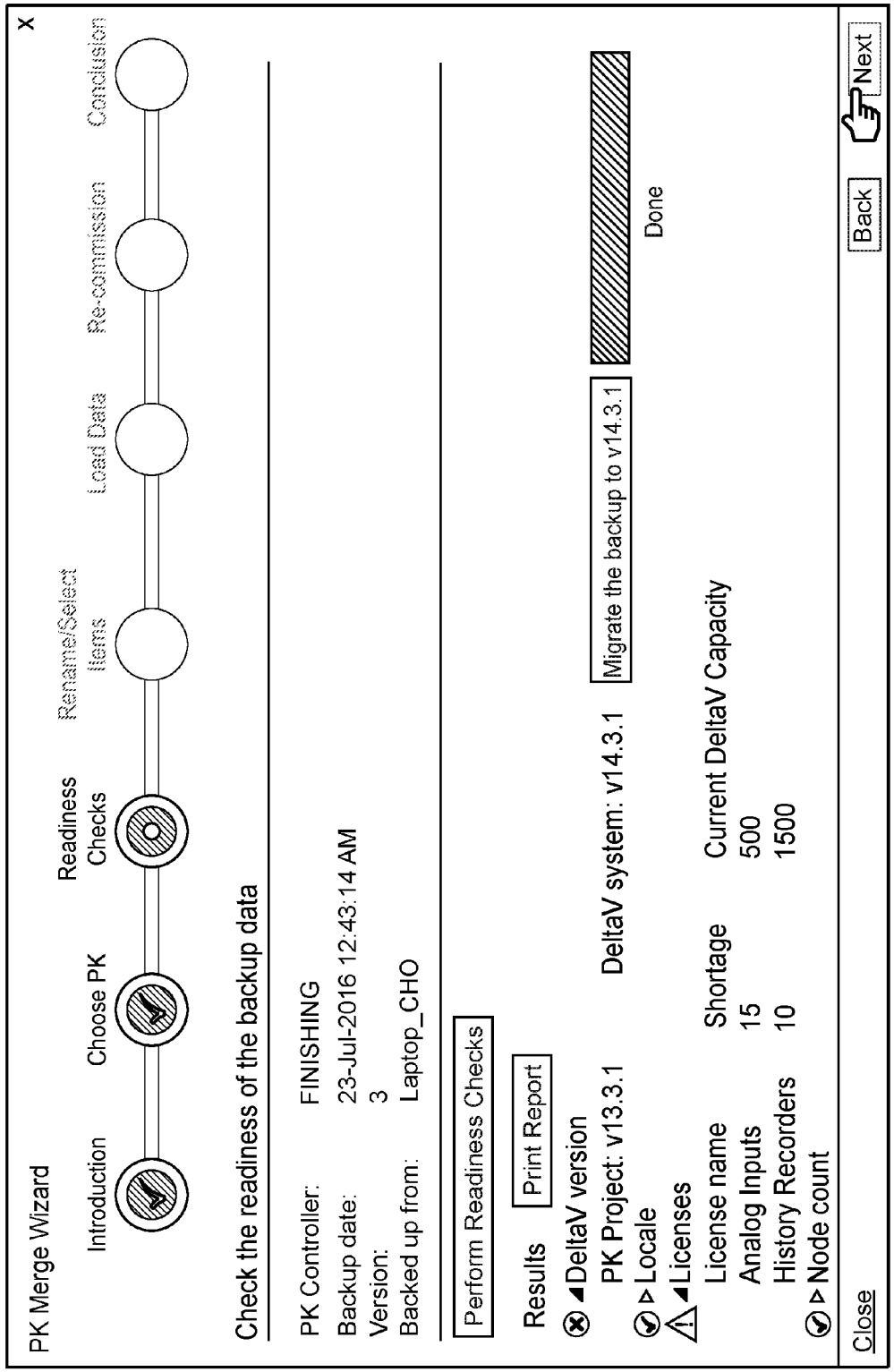

As illustrated in FIG. 6K, the operator can select the version category. In this example scenario, the distributed control system and the modular control systems are built on the DeltaV platform. The merge assistant 150 displays the version of DeltaV of the distributed control system and provides a control for migrating the project to a different version (FIG. 6L). The operator in this scenario chooses to conduct the migration (FIGS. 6M, 6N). Further, the operator also can choose to review the licenses (FIG. 6O).

Now referring to FIG. 6P, the merge assistant 150 next can proceed to modifying, in view of operator input, various conflicting items and notifying the operator regarding non-conflicting items. For each conflicting item, the merge assistant 150 can display the name of the conflicting item, the configuration type (e.g., graphics, logic, hardware), item type (e.g., globals, control module, equipment module, controller), modification history, indications whether the item in the modular control system or the distributed control system is newer, etc. The merge assistant 150 can display similar information for non-conflicting items, except that of course there are no indications of conflicting information for non-conflicting items. The merge assistant 150 can provide an interactive control for grouping the conflicting and/or non-conflicting items based on various criteria, for operator convenience.

Figure 6R:
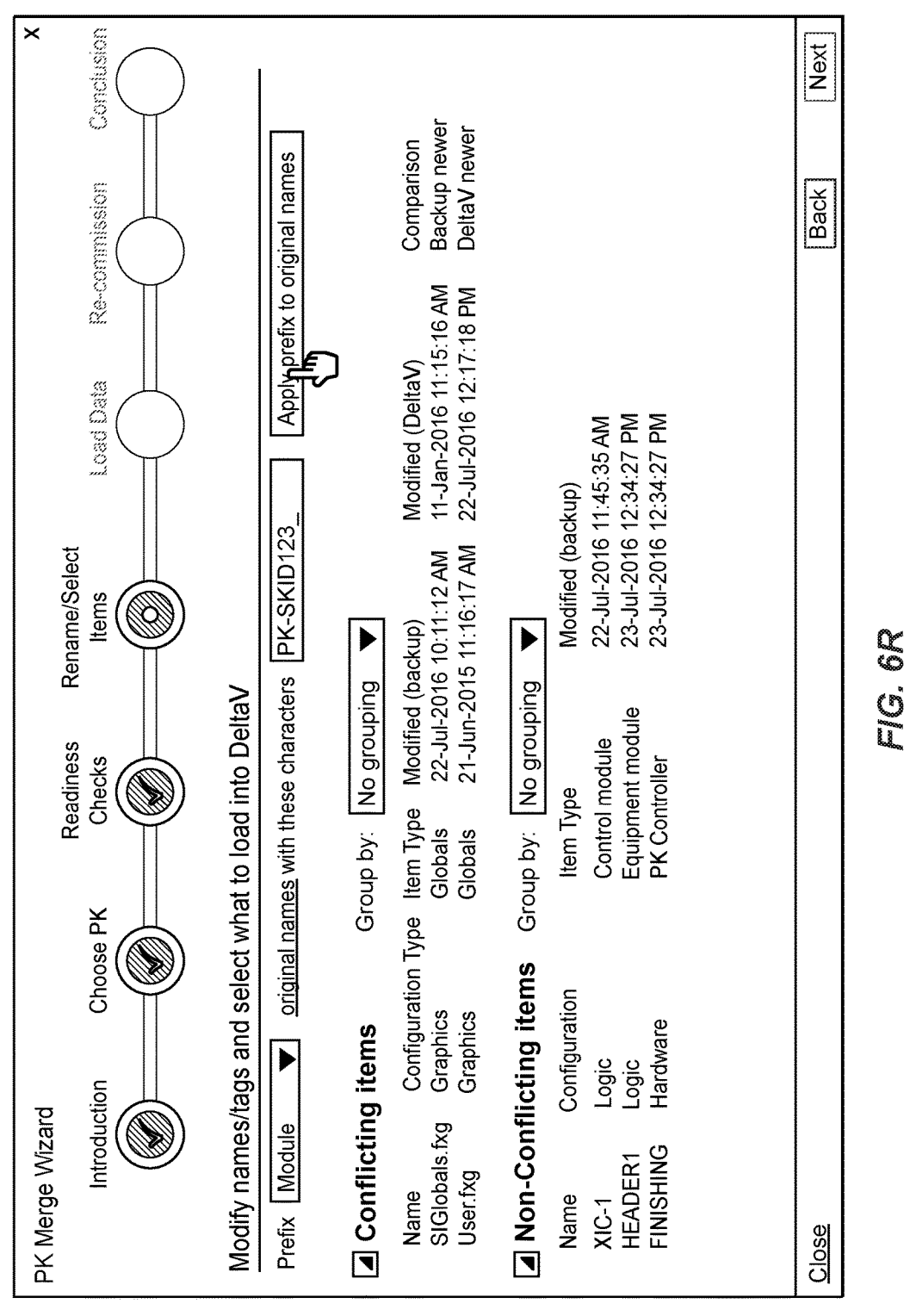

The merge assistant 150 also can provide an interactive control for adding a prefix to the names of conflicting items to resolve all the conflicts as a single operation. In other implementations, the merge assistant 150 can allow the operator modify the names in any suitable manner, such as by attaching a postfix rather than a prefix. In response to the operator selecting this control, as illustrated in FIG. 6P, the merge assistant 150 allows the operator to specify the specific characters to add to the names of items of a selected type (FIG. 6Q). The operator in this case chose to apply the prefix to the original names of modules only, rather than all items. The user the can actuate a control to prepend the specific name to the conflicting items (FIG. 6R). As illustrated in FIG. 6S, once the renaming operation completes, the merge assistant 150 moves the renamed items from the conflicting item group into the non-conflicting item group.

Figure 6U:
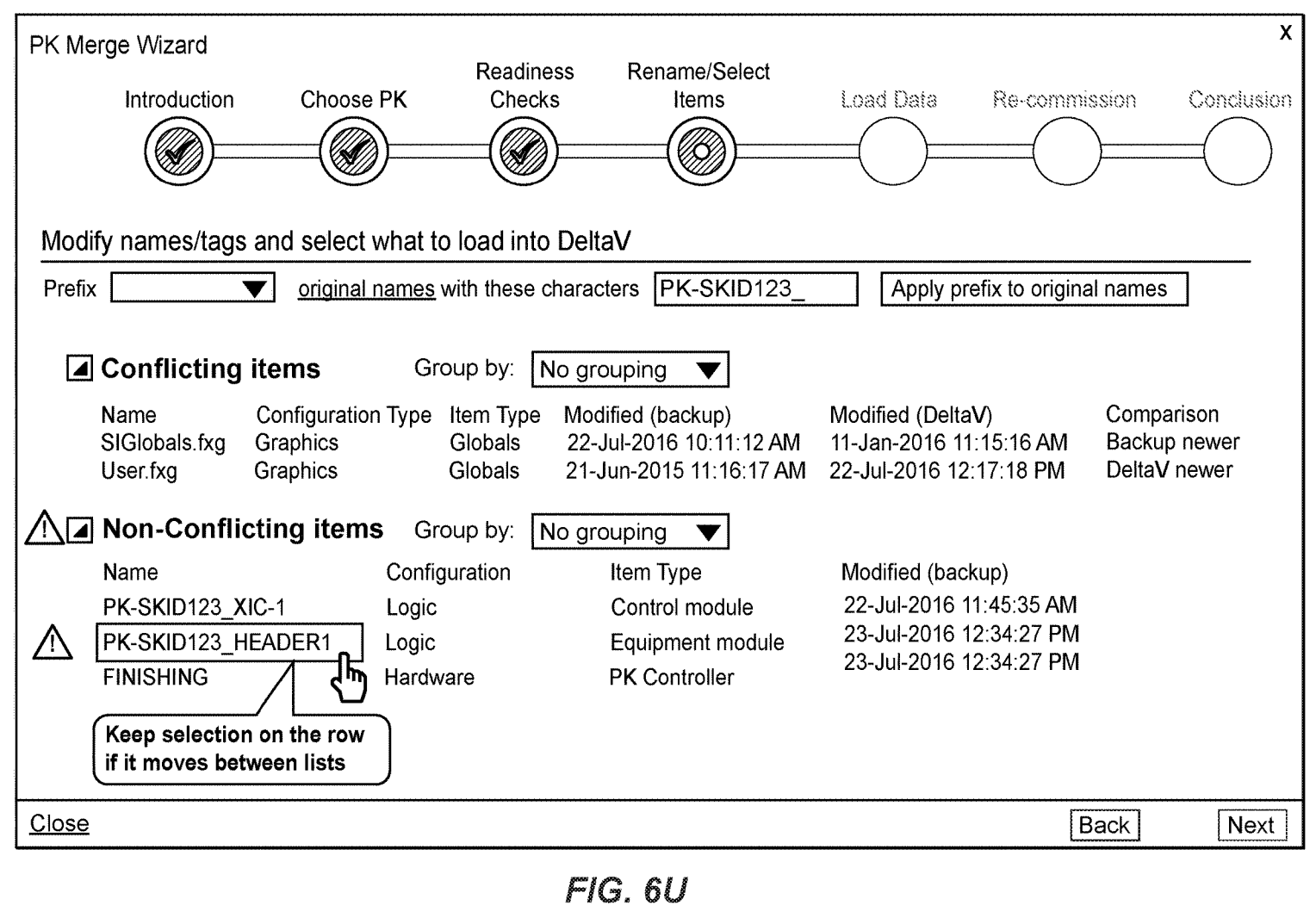

The operator in some cases can attempt to add to the original names of items a string that results in the overall length exceeding a certain limit (FIG. 6T). The operator can modify the names as appropriate prior to initiating a download, as illustrated in FIG. 6U. The merge assistant 150 can display the modified names in the listing of non-conflicting items (FIG. 6V).

In some implementations, the merge assistant 150 carries out the step discussed with reference to FIGS. 6P-S automatically. For example, the merge assistant 150 can generate the name based on the order in which the modular control system was detected (e.g., "PK_1_" after detecting the first modular control system, "PK_2_" after detecting the second modular control system, etc.).

Further, the merge assistant 150 in some cases can analyze the prefixes the operator supplies to recognize intents. The merge assistant 150 then can automatically provide renaming suggestions in line with the operator's previous selections. For example, if the operator first uses the merge assistant 150 to integrate three modular control systems into the larger control system and adds the prefixes "PK_1_," PK_2_," and PK_3_," respectively, the merge assistant 150 can automatically suggest "PK_4_" when the operator uses the merge assistant 150 to integrate another modular control system.

Now referring to 6W, the merge assistant 150 can generate a single interactive screen via which the operator can select which of the conflicting items and non-conflicting items should be downloaded into the modular controller. The operator can use checkboxes to select and unselect individual items, item types, or even entire configuration types.

Figure 6X:
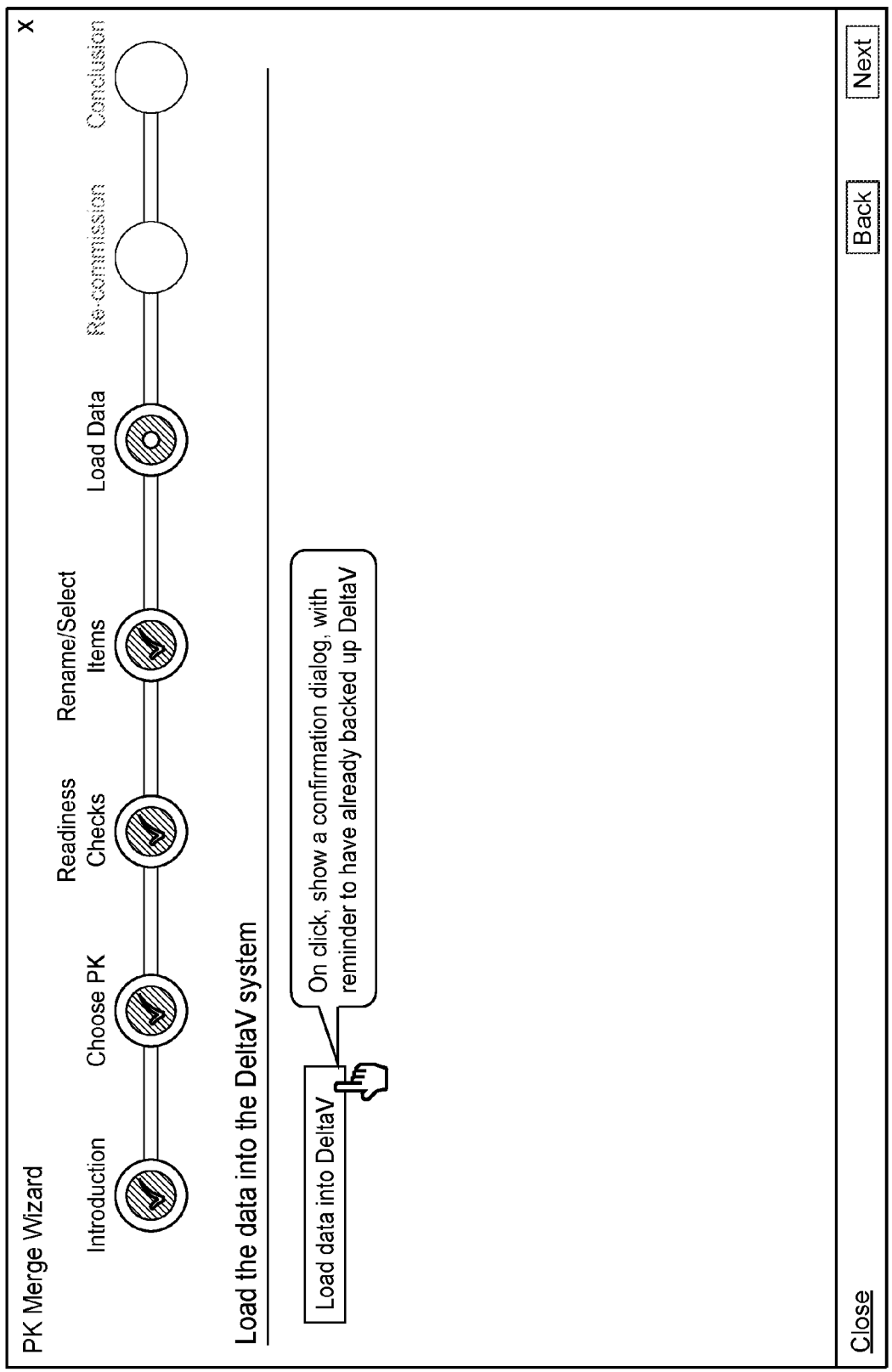
FIGS. 6P-W relate to resolving conflicting configuration items and reviewing non-conflicting configuration items, FIGS. 6X-Z relate to loading selecting configuration items, FIGS. 6AA-6AH relate to decommissioning and re-commissioning nodes of a modular control system being merged into a larger process control network, and FIG. 6AI relates to final operator instruction.
Figure 6Y:
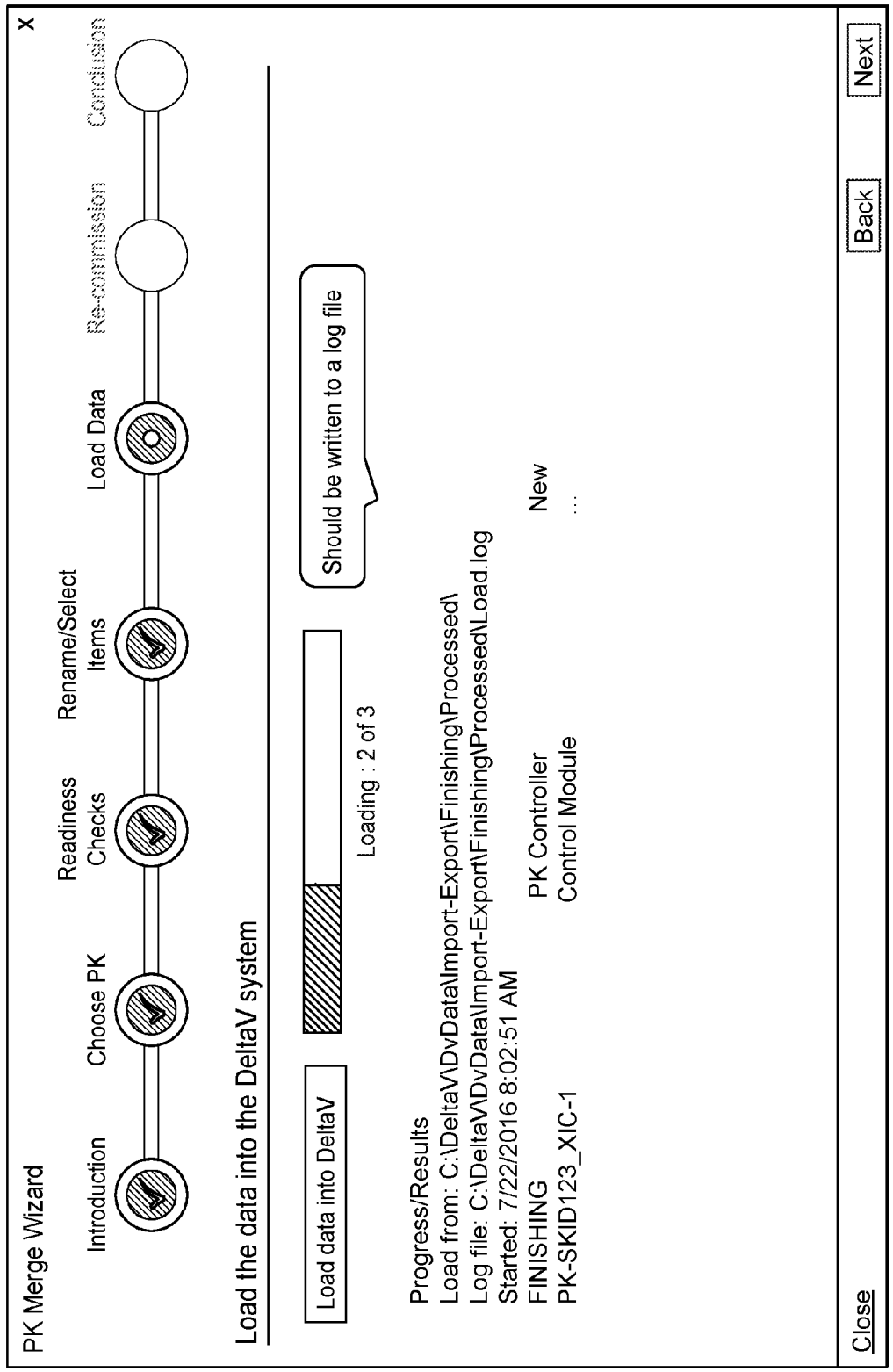
Figure 6A:
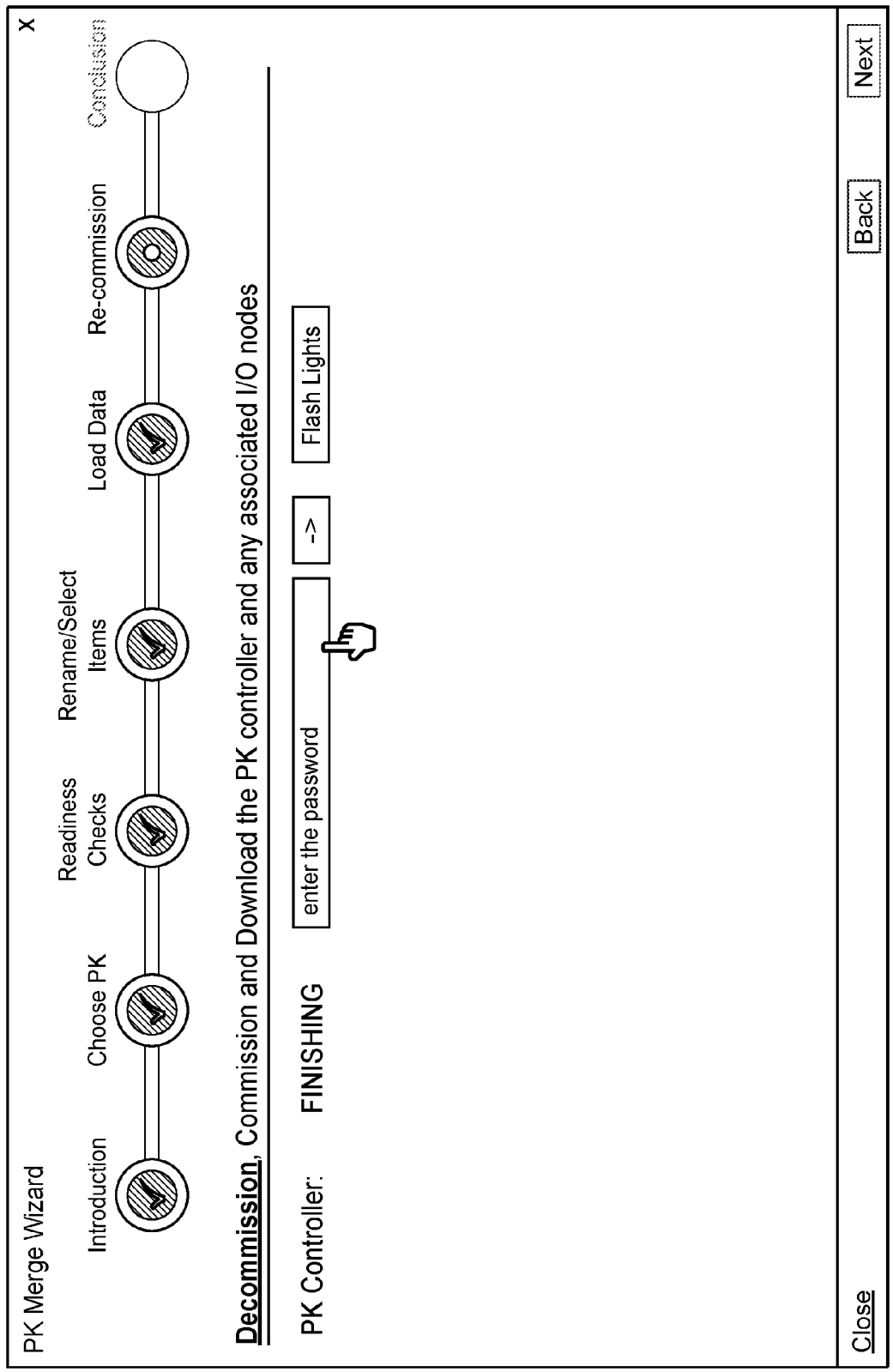
Figure 6A:
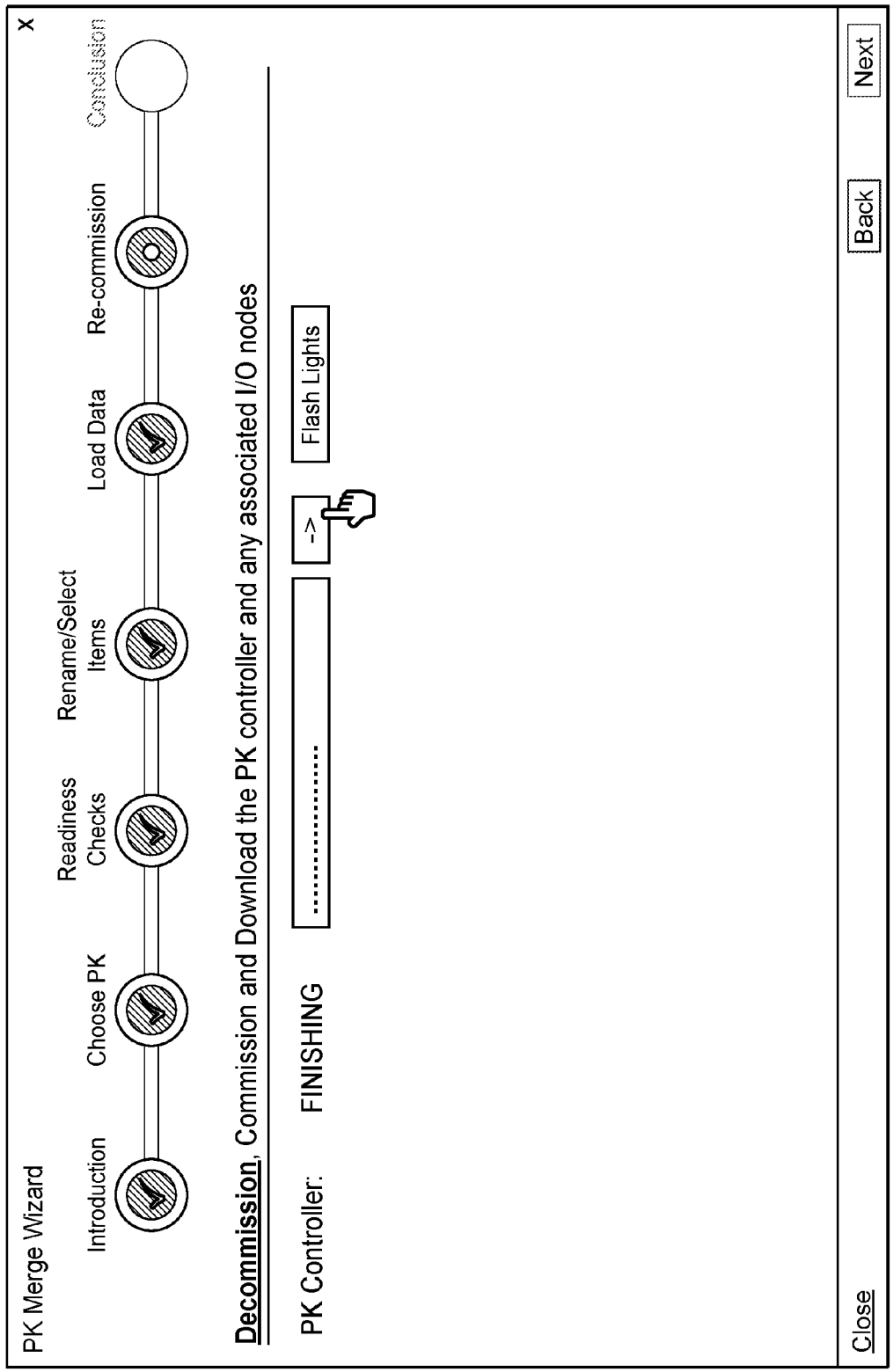
Figure 6A:
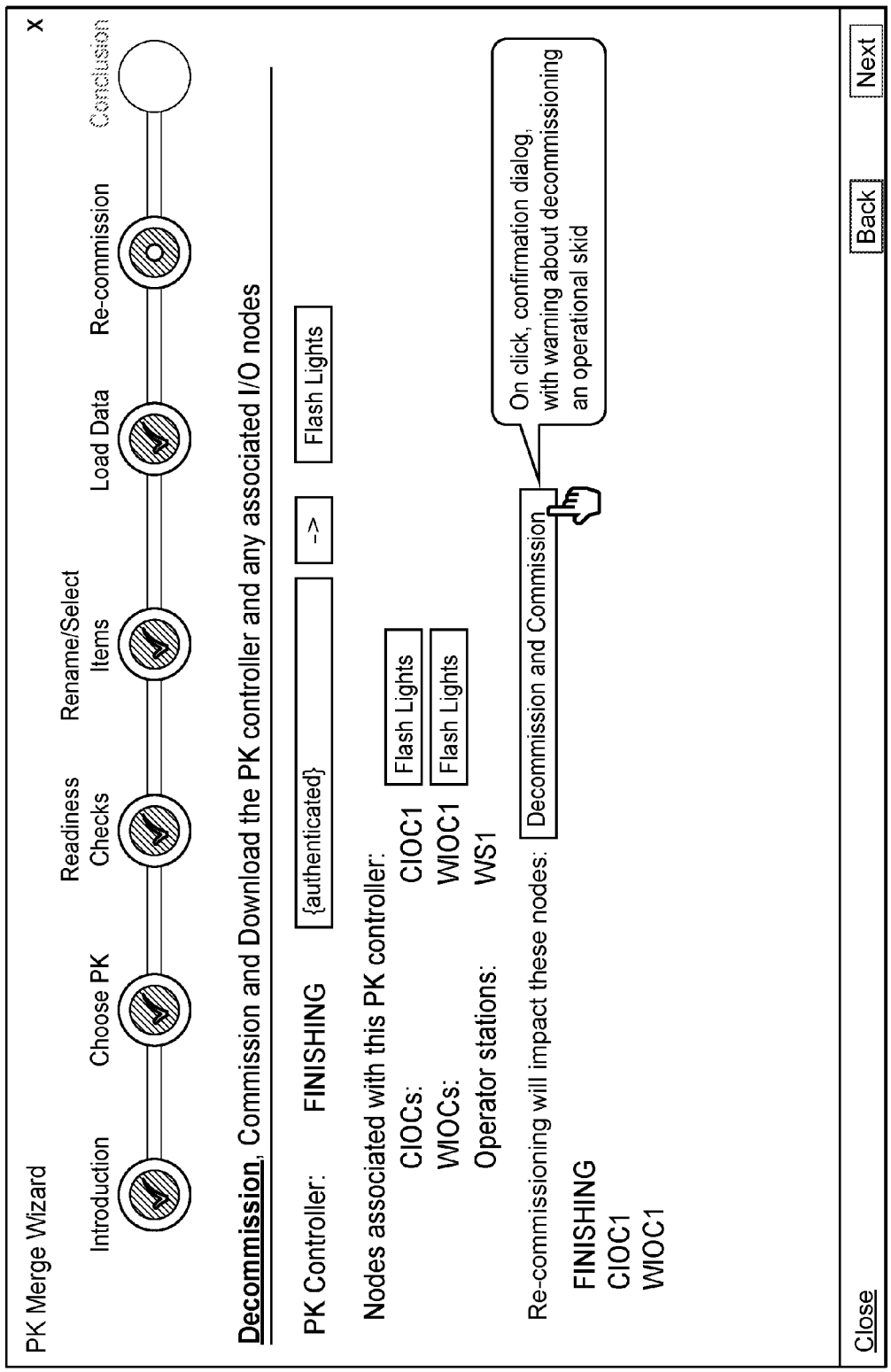
Figure 6A:
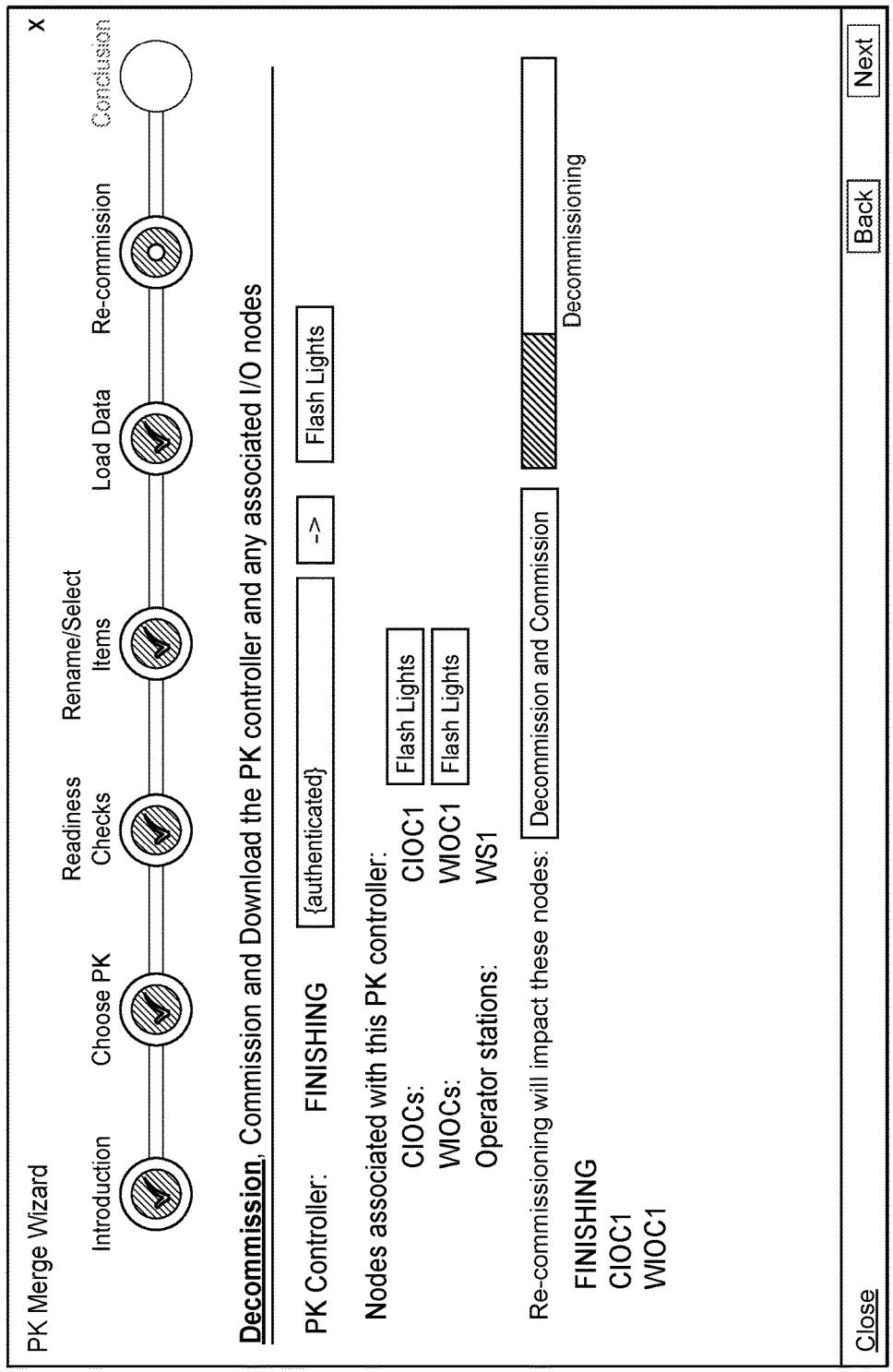
Figure 6A:
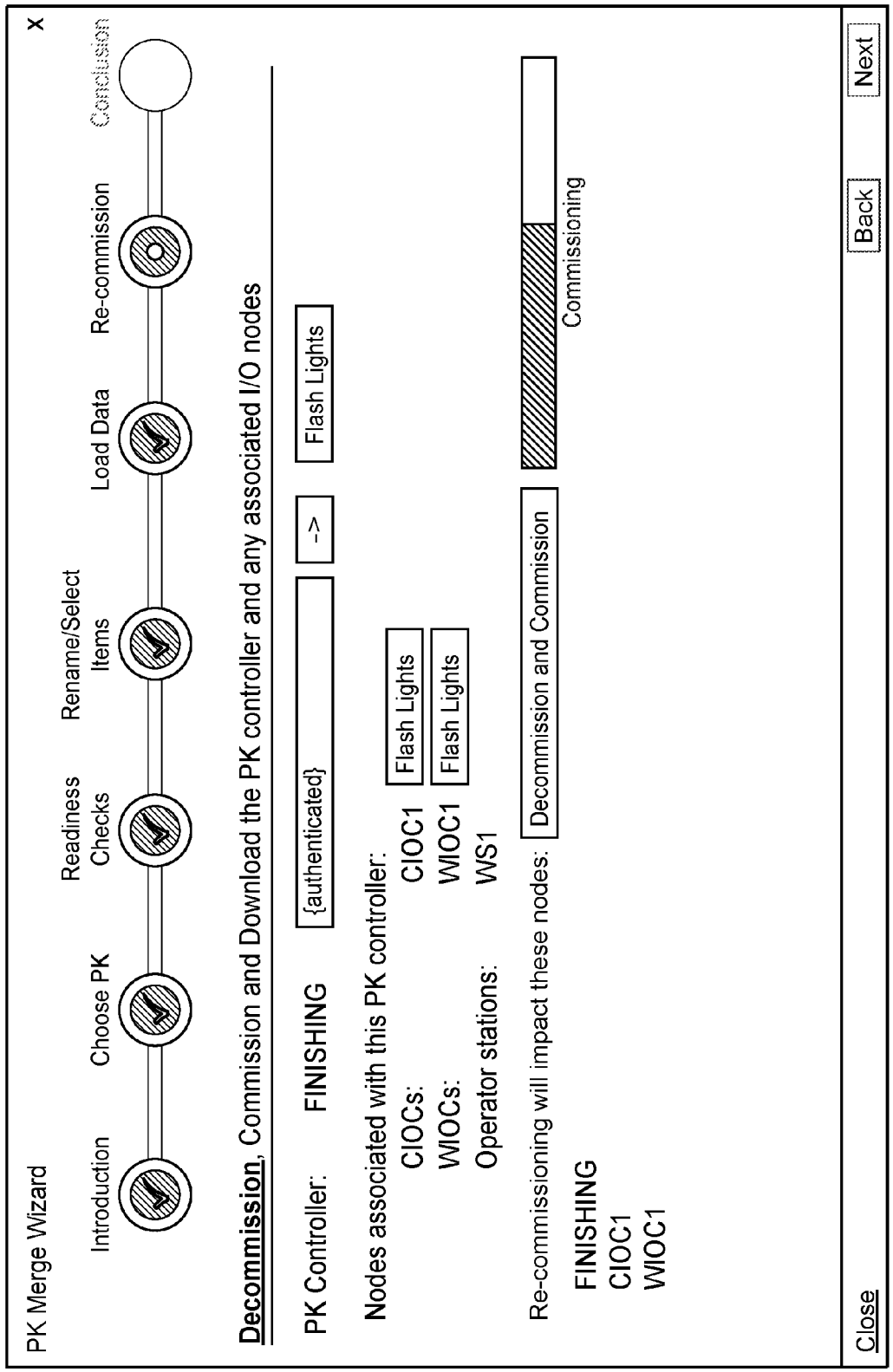
Figure 6A:
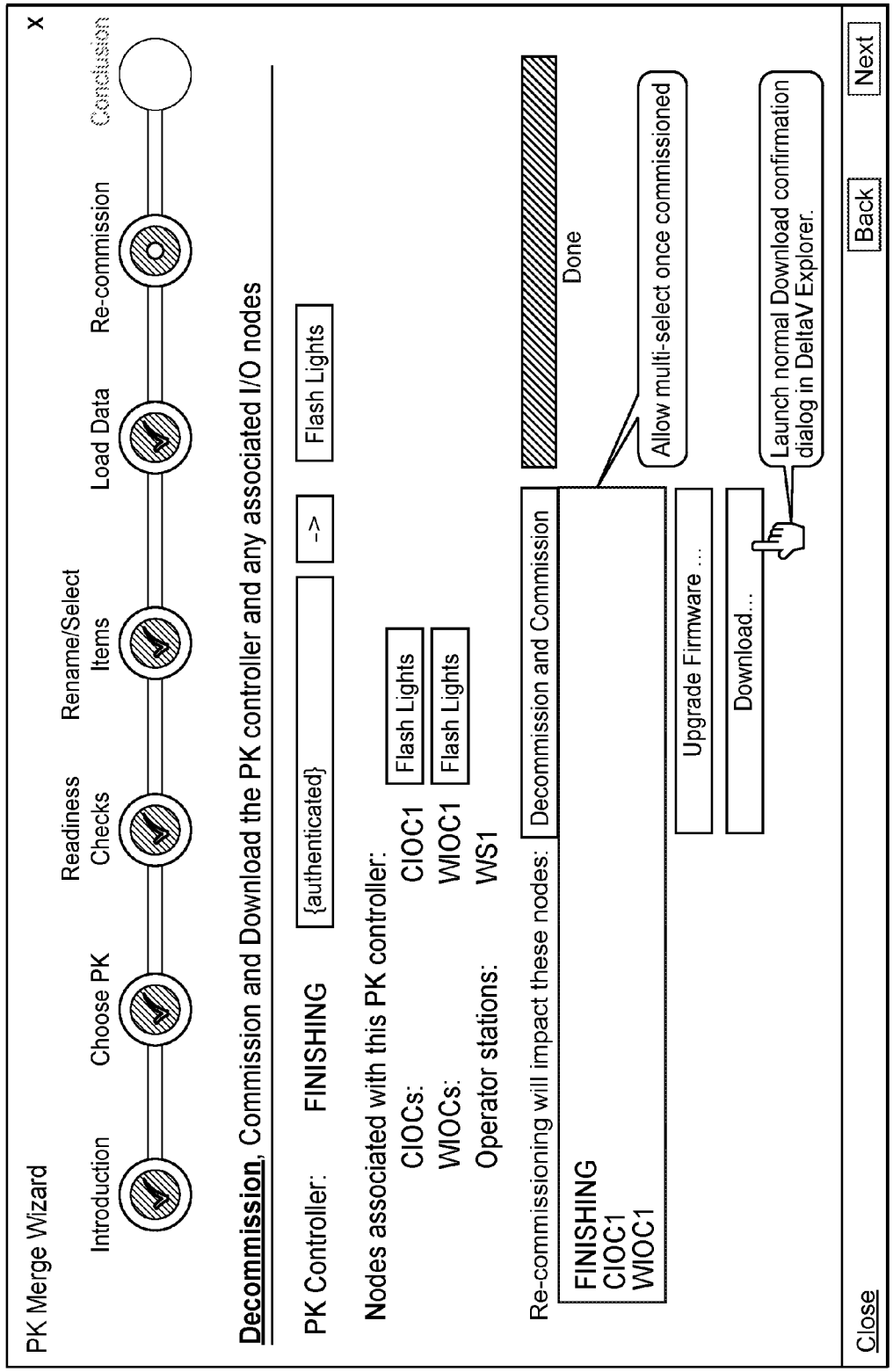
Figure 6A:
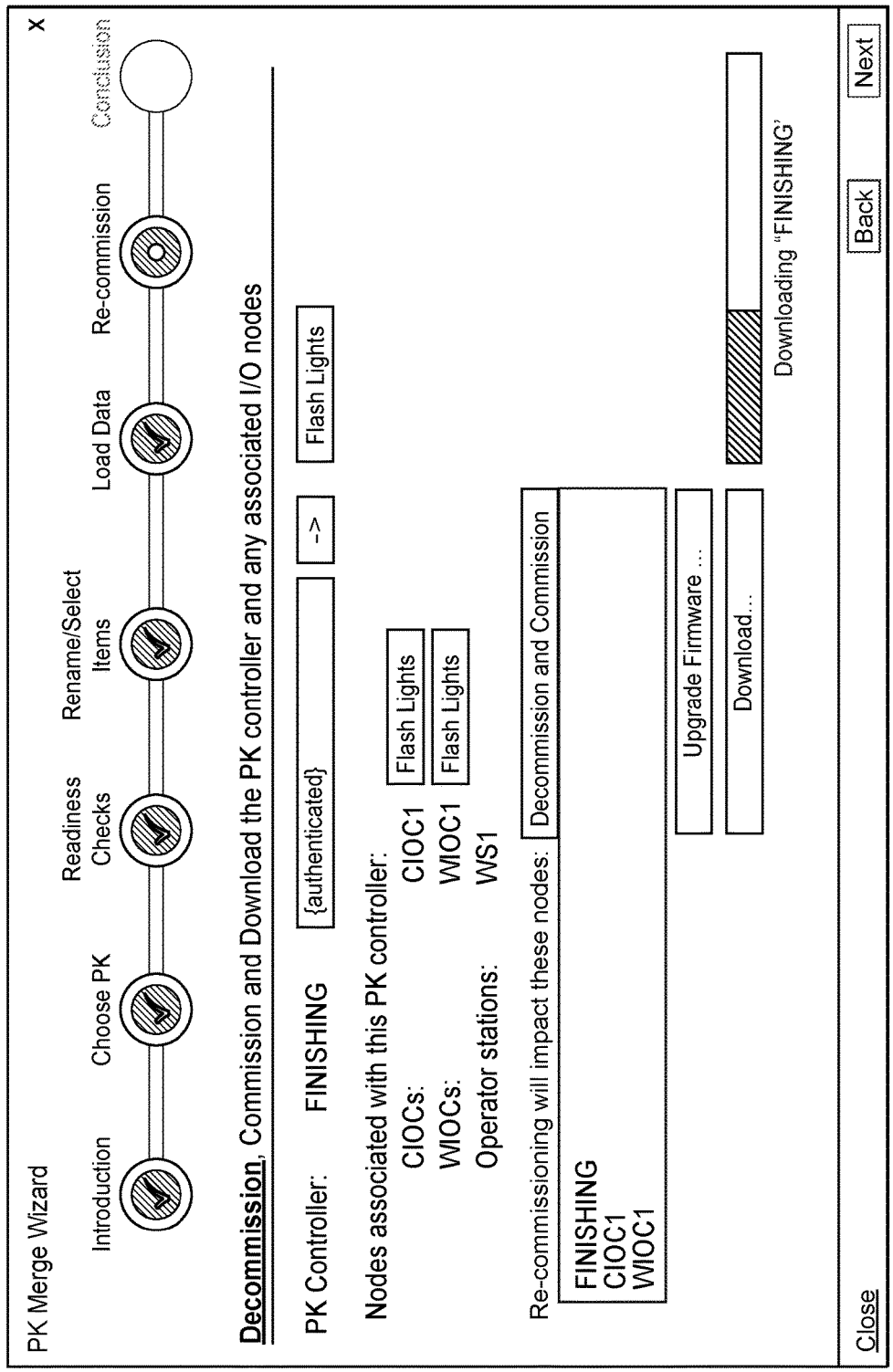
Figure 6A:
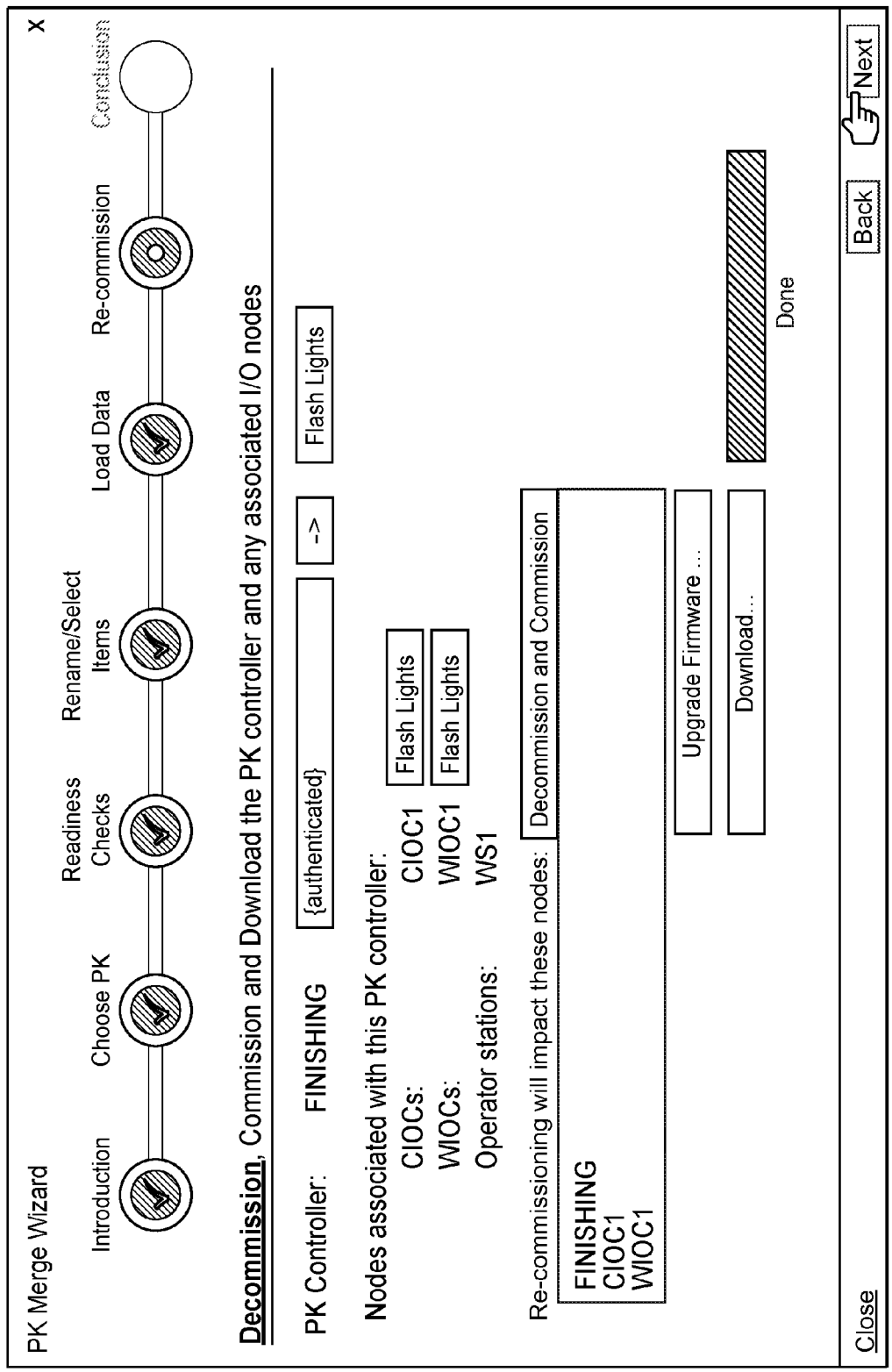
Figure 6A:
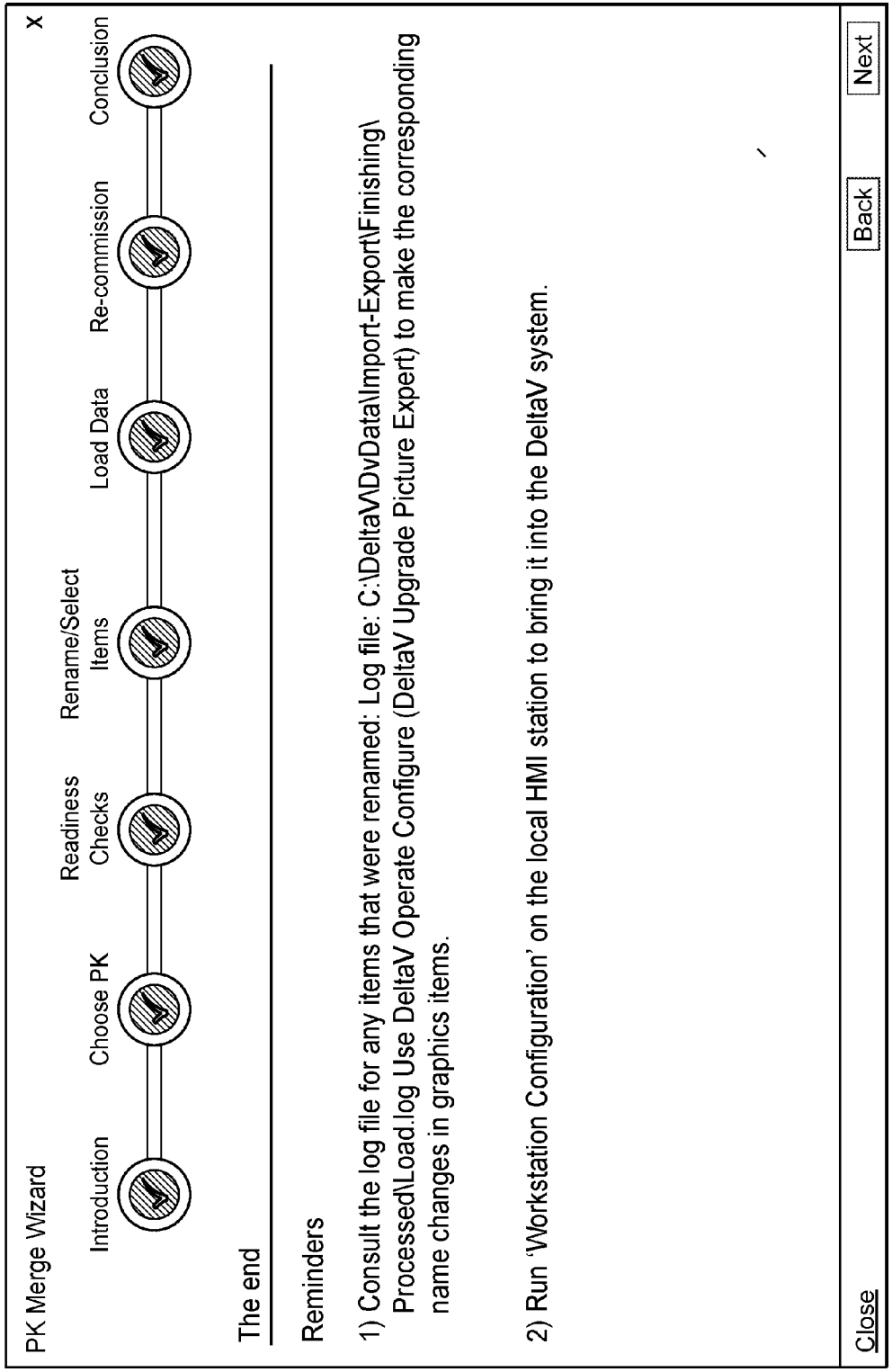

Next, the merge assistant 150 can provide a control for the operator to initiate a download of the configuration data into the modular control system (FIG. 6X). The merge assistant 150 can display progress and the results (FIGS. 6Y and 6Z).

The merge assistant 150 then provide an operator controller for initiating the decommissioning and re-commissioning of the modular control system (FIG. 6AA). The merge assistant 150 then provides an indication of the nodes of the modular control system and a control for selecting which of these nodes should be re-commissioned (FIGS. 6AB and AC). The merge assistant 150 then can sequentially decommission and re-commission the individual nodes (FIGS. 6AD and 6AE). Once the nodes have been re-commissioned, the merge assistant 150 can provide operator controls for upgrading and downloading firmware (FIG. 6AF). In some implementations, the merge assistant 150 allows the operators to select multiple nodes at the same time. FIGS. 6AG and 6AH illustrate example screenshots the merge assistant 150 can display to notify the operator of the progress of downloading firmware. The merge assistant then can notify the operator that the integration process is completed (FIG. 6AI).

In some implementations, the merge assistant 150 also can provide additional functionality such as providing a visual representation of various items to facilitate manual merging. For example, the merge assistant 150 can display, on one side, a visual representation of the configuration of a modular control system and, on the other side, a visual representation of the corresponding portion of the configuration of the distributed control system, and the user can drag-and-drop items from one side to the other side, for example, or otherwise use the visual representation to make the merging more efficient and/or accurate.

Additional Remarks

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the techniques of this disclosure have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A modular control system comprising:
   a modular controller that implements control logic of the modular control system, wherein the controller is built natively on a platform of a distributed control system and implements a proprietary communication protocol of the distributed control system;
   equipment configured to perform a physical function in a process plant according to the control logic; and
   a configuration database storing configuration parameters of the modular control system;
   wherein:
   in a first mode of operation, the modular control system operates as a standalone module, and
   in a second mode of operation, the modular control system operates natively as one or more nodes of a distributed control system.

2. The modular control system of claim 1, wherein the modular controller shares at least one software layer with a controller operating in the distributed control system.

3. The modular control system of claim 1, wherein in the second mode of operation, one or more of the configuration parameters stored in the configuration database are renamed to avoid conflicts with identically named configuration parameters in a centralized configuration database of the distributed control system.

4. The modular control system of claim 3, wherein in the second mode of operation, the one or more of the configuration parameters that are renamed to include a shared prefix.

5. The modular control system of claim 1, further comprising:
   a physical frame housing the modular controller, the equipment, and the configuration database, wherein the modular control system is a skid-mounted system transportable as a single unit.

6. The modular control system of claim 5, wherein the equipment includes a sensor that generates a signal indicative of a parameter value and provides the signal to the modular controller.

7. The modular control system of claim 1, further comprising:
   a first register storing a first network address, and
   a second register storing a second network address.

8. The modular control system of claim 7, wherein:
   the first network address is defined according to a scheme of the distributed control system, wherein the modular controller is addressable using the first network address from other nodes of the distributed control system; and
   the second network address is defined according to a scheme of the modular control system, wherein the modular controller is addressable using the second network address from a node that supports a proprietary communication protocol of the modular control system;
   wherein the proprietary protocol of the modular control system is different from a communication protocol of the distributed control system.

9. A distributed control system comprising:
   a centralized configuration database storing configuration parameters of the distributed control system;
   a first controller that implements at least a portion of control logic of the distributed control system; and
   a second controller that implements control logic of a modular control system that implements control logic of a modular control system, wherein the modular control system includes:
   a first register storing a first network address, and
   a second register storing a second network address, and
   wherein the second controller is configured to operate as:
   a standalone module independently of the distributed control system in a first mode of operation, and
   one or more nodes of the distributed control system in a second mode of operation;
   wherein the first controller and the second controller share a software layer that specifies one or more of (i) a configuration procedure, (ii) a security mechanism, or (iii) a communication protocol.

10. The distributed control system of claim 9, wherein the modular control system includes equipment configured to perform a physical function in a process plant according to the control logic of the modular control system.

11. The distributed control system of claim 10, wherein the modular control system further includes a configuration database that stores configuration parameters of the modular control system.

12. The distributed control system of claim 11, wherein the modular control system includes a physical frame housing the second controller, the equipment, and the configuration database, wherein the modular control system is a skid-mounted system transportable as a single unit.

13. The distributed control system of claim 9, wherein the modular control system includes a configuration database storing configuration parameters of the distributed control system, and wherein a plurality of the configuration parameters of the distributed control system are merged into the centralized configuration database in the second mode of operation.

14. The distributed control system of claim 9, wherein a plurality of the configuration parameters of the distributed control system are not merged into the centralized configuration database in the second mode of operation.

15. The distributed control system of claim 9, wherein:
   the first network address is defined according to a scheme of the distributed control system, wherein the first controller is addressable using the first network address from other nodes of the distributed control system; and
   the second network address is defined according to a scheme of the modular control system, wherein the second controller is addressable using the second network address from a node that supports a proprietary communication protocol of the modular control system;
   wherein the proprietary protocol of the modular control system is different from a communication protocol of the distributed control system.

16. A method of integrating modular control systems into distributed control systems, the method comprising:
   detecting, by one or more processors, that a modular control system is communicatively coupled to a local area network of a distributed control system, wherein the modular control system includes a modular controller that implements control logic of the modular control system in a standalone mode of operation;
   retrieving, by the one or more processors, configuration data from a configuration database of the modular control system;
   identifying, by the one or more processors, configuration items that are conflicting with configuration items at other nodes of the distributed control system, including querying a centralized configuration data of the distributed control system;
modifying at least some of the configuration items determined to be conflicting; and
updating the configuration data of the modular control system so that the modular control system can operate as one or several nodes of the distributed control system.

17. The method of claim 16, wherein modifying at least some of the configuration items determined to be conflicting includes prepending a shared prefix to each of the at least some of the configuration items.

18. The method of claim 17, further comprising receiving the shared prefix from an operator via a user interface.

19. The method of claim 17, wherein prepending the shared prefix includes:
automatically generating a suggested alphanumeric string to be used as the shared prefix; and
providing the suggested alphanumeric string to an operator via a user interface.

20. The method of claim 19, further comprising automatically generating the suggested alphanumeric string based on an order in which the modular control system is detected relative to one or more other modular control systems detected on the local area network.

21. The method of claim 16, further comprising:
in response to detecting the modular control system, automatically checking, by the one or more processors, at least one of:
(i) one or more licenses with which the modular controller is provisioned,
(ii) a node configuration of the modular controller,
(iii) a software version of the modular controller, and
(iv) a locale for which the modular control system is provisioned; and
providing a notification indicative of results of the checking.

22. The method of claim 16, further comprising:
executing, on a computing device communicatively coupled to the local area network, a merge assistant that facilitates merging of configuration data of the modular control system into the centralized configuration data of the distributed control system.

23. The method of claim 16, wherein the identified configuration items are first configuration items, the method further comprising:
identifying second configuration items that are conflicting with configuration items at other nodes of the distributed control system;
checking item types for the second configuration items; and
in response to determining that types of the second configuration items correspond to configuration items that persist in the modular control system, generating a warning regarding the second configuration items.

24. The method of claim 16, further comprising:
decommissioning nodes of the modular control system;
downloading modified configuration data into the modular control system; and
re-commissioning the modular control system.

25. The method of claim 16, wherein the modular controller is built natively on a platform of a distributed control system.

26. The method of claim 16, wherein the modular controller shares at least one software layer with a controller operating in the distributed control system.

27. The method of claim 16, wherein the modular controller implements a proprietary communication protocol of the distributed control system.

28. The method of claim 16, further comprising:
detecting redundancy between a first module in the configuration database of the modular control system and a second module in the configuration database of the distributed control system; and
automatically generating a single shared module to be stored in the configuration database of the distributed control system and referenced by a node in the modular control system and a node in the distributed control system.

29. A non-transitory computer-readable medium storing instructions that implement a merge assistant configured to facilitate integration of modular control systems into distributed control systems, wherein the merge assistant executes on one or more processors to:
detect a modular control system coupled to a local area network on which a distributed control system operates;
retrieve configuration data from the modular control system; and
generate a sequence of user interface screens to guide an operator during integration of the modular control system into the distributed control system, including generate at least one screen listing multiple configuration items in the configuration data of the modular control system that conflict with configuration data of the distributed control system.

30. The computer-readable medium of claim 29, wherein the merge assistant is further configured to:
modify the conflicting configuration items in accordance with operator input; and
load the modified configuration items into at least one of a configuration database of the modular control system or a configuration database of the distributed control system.

31. The computer-readable medium of claim 29, wherein the merge assistant is further configured to:
in response to detecting the modular control system, automatically check at least one of:
(i) one or more licenses with which a modular controller of the modular control system is provisioned,
(ii) a node configuration of the modular controller,
(iii) a software version of the modular controller, and
(iv) a locale for which the modular control system is provisioned; and
provide a notification indicative of results of the checking.

32. The computer-readable medium of claim 29, wherein the merge assistant is further configured to automatically generate a suggested alphanumeric string to be added to the configuration items to resolve conflicts with the configuration data of the distributed control system.

33. The computer-readable medium of claim 29, wherein the identified configuration items are first configuration items, and wherein the merge assistant is further configured to:
identify second configuration items that are conflicting with configuration items at other nodes of the distributed control system;
check item types for the second configuration items; and
in response to determining that types of the second configuration items correspond to configuration items that persist in the modular control system, generate a warning regarding the second configuration items.

34. The computer-readable medium of claim 29, wherein the merge assistant is further configured to provide, in the sequence of user interface screens, a screen for decommissioning nodes of the modular control system and automatically re-commissioning nodes of the modular control system with updated configuration data.

35. A computing device comprising:
one or more processors;
a user interface coupled to the one or more processors;
a non-transitory computer-readable medium storing thereon instructions that implement a merge assistant configured to facilitate integration of modular control systems into distributed control systems, wherein the merge assistant executes on the one or more processors to:
detect a modular control system coupled to a local area network on which a distributed control system operates,
retrieve configuration data from the modular control system, and
generate a sequence of user interface screens to guide an operator during integration of the modular control system into the distributed control system, including generate at least one screen listing multiple configuration items in the configuration data of the modular control system that conflict with configuration data of the distributed control system.

36. The computing device of claim 35, wherein the merge assistant is further configured to:
modify the conflicting configuration items in accordance with operator input; and
load the modified configuration items into at least one of a configuration database of the modular control system or a configuration database of the distributed control system.

37. The computing device of claim 35, wherein the merge assistant is further configured to:
in response to detecting the modular control system, automatically check at least one of:
(i) one or more licenses with which a modular controller of the modular control system is provisioned,
(ii) a node configuration of the modular controller,
(iii) a software version of the modular controller, and
(iv) a locale for which the modular control system is provisioned; and
provide a notification indicative of results of the checking.

38. The computing device of claim 35, wherein the merge assistant is further configured to automatically generate a suggested alphanumeric string to be added to the configuration items to resolve conflicts with the configuration data of the distributed control system.

39. The computing device of claim 35, wherein the identified configuration items are first configuration items, and wherein the merge assistant is further configured to:
identify second configuration items that are conflicting with configuration items at other nodes of the distributed control system;
check item types for the second configuration items; and
in response to determining that types of the second configuration items correspond to configuration items that persist in the modular control system, generate a warning regarding the second configuration items.

40. The computing device of claim 35, wherein the merge assistant is further configured to provide, in the sequence of user interface screens, a screen for decommissioning nodes of the modular control system and automatically re-commissioning nodes of the modular control system with updated configuration data.

* * * * *